(12) United States Patent
Takano et al.

(10) Patent No.: US 12,500,262 B2
(45) Date of Patent: Dec. 16, 2025

(54) SOLID-STATE BATTERY

(71) Applicant: Murata Manufacturing Co., Ltd., Nagaokakyo (JP)

(72) Inventors: Ryohei Takano, Nagaokakyo (JP); Makoto Yoshioka, Nagaokakyo (JP); Takeo Ishikura, Nagaokakyo (JP); Akisuke Ito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 628 days.

(21) Appl. No.: 17/850,284

(22) Filed: Jun. 27, 2022

(65) Prior Publication Data

US 2022/0336854 A1    Oct. 20, 2022

Related U.S. Application Data

(63) Continuation of application No. PCT/JP2021/000383, filed on Jan. 7, 2021.

(30) Foreign Application Priority Data

Jan. 16, 2020    (JP) ................. 2020-005425

(51) Int. Cl.
  *H01M 10/0562*    (2010.01)
  *H01M 4/02*       (2006.01)
  *H01M 4/04*       (2006.01)
  *H01M 4/485*      (2010.01)
  *H01M 10/0525*    (2010.01)

(52) U.S. Cl.
  CPC ..... *H01M 10/0562* (2013.01); *H01M 4/0471* (2013.01); *H01M 4/485* (2013.01); *H01M 10/0525* (2013.01); *H01M 2004/027* (2013.01); *H01M 2300/0071* (2013.01)

(58) Field of Classification Search
  None
  See application file for complete search history.

(56) References Cited

U.S. PATENT DOCUMENTS

| | | | |
|---|---|---|---|
| 9,559,396 B2 * | 1/2017 | Lee | H01M 12/08 |
| 2004/0234856 A1 | 11/2004 | Morigaki et al. | |
| 2013/0209882 A1 | 8/2013 | Kim et al. | |
| 2014/0308570 A1 | 10/2014 | Gaben et al. | |
| 2017/0263981 A1 * | 9/2017 | Satou | H01M 4/663 |
| 2019/0027724 A1 * | 1/2019 | Xing | H01M 10/0562 |
| 2020/0106131 A1 * | 4/2020 | Takano | H01M 50/434 |
| 2020/0259213 A1 * | 8/2020 | Takano | H01M 10/0562 |
| 2020/0266445 A1 * | 8/2020 | Tsukada | H01M 10/0525 |
| 2022/0320503 A1 * | 10/2022 | Takano | H01M 4/366 |
| 2022/0336807 A1 * | 10/2022 | Takano | H01M 4/525 |
| 2022/0356068 A1 * | 11/2022 | Naoi | H01M 4/131 |
| 2023/0006200 A1 * | 1/2023 | Takano | H01M 4/626 |
| 2023/0060930 A1 * | 3/2023 | Takano | H01M 4/626 |
| 2023/0291008 A1 * | 9/2023 | Takara | C04B 35/50 |
| 2023/0402606 A1 * | 12/2023 | Takano | H01M 4/485 |
| 2024/0290964 A1 * | 8/2024 | Takano | H01M 10/0585 |

FOREIGN PATENT DOCUMENTS

| | | |
|---|---|---|
| JP | H10302769 A | 11/1998 |
| JP | H11283664 A | 10/1999 |
| JP | 2002373643 A | 12/2002 |
| JP | 200511801 A | 1/2005 |
| JP | 2013165061 A | 8/2013 |
| JP | 2014534591 A | 12/2014 |
| JP | 2017195033 A | 10/2017 |
| WO | 2014170998 A1 | 10/2014 |
| WO | 2019044901 A1 | 3/2019 |
| WO | 2019093403 A1 | 5/2019 |

OTHER PUBLICATIONS

Derwent Abstract of WO 2019-044901 A1 (Year: 2019).*
Liao et al. (Adv. Eng. Mat., 2018,8,1701621) (Year: 2018).*
Kuwano et al. (Yogyo Kyokai Shi, 95,2, 1987, 38-43) (Year: 1987).*
International Search Report in PCT/JP2021/000383, mailed Feb. 22, 2021, 3 pages.

* cited by examiner

*Primary Examiner* — Kevin M Bernatz
(74) *Attorney, Agent, or Firm* — ArentFox Schiff LLP

(57) ABSTRACT

A solid-state battery that includes a negative electrode layer and a solid electrolyte layer. The negative electrode layer contains a negative electrode active material in which a molar ratio of Li to vanadium (V) is 2.0 or more, the solid electrolyte layer contains a solid electrolyte having a lithium super ionic conductor (LISICON)-type structure and containing at least V, and the solid electrolyte contained in the solid electrolyte layer has an average chemical composition represented by $(Li_{[3-ax+(5-b)(1-y)]}A_x)(V_y B_{1-y})O_4$.

18 Claims, No Drawings

SOLID-STATE BATTERY

CROSS REFERENCE TO RELATED APPLICATIONS

The present application is a continuation of International application No. PCT/JP2021/000383, filed Jan. 7, 2021, which claims priority to Japanese Patent Application No. 2020-005425, filed Jan. 16, 2020, the entire contents of each of which are incorporated herein by reference.

FIELD OF THE INVENTION

The present invention relates to a solid-state battery.

BACKGROUND OF THE INVENTION

In recent years, the demand for batteries as power sources for portable electronic devices such as mobile phones and portable personal computers has been expanded greatly. In each of the batteries used for such applications, an electrolyte (electrolytic solution) such as an organic solvent has been conventionally used as a medium for moving ions.

However, the battery having the above configuration has a risk that the electrolytic solution leaks and has a problem that an organic solvent or the like used for the electrolytic solution is a combustible substance. Therefore, it has been proposed to use a solid electrolyte instead of the electrolytic solution. In addition, the development of a sintered solid-state secondary battery, in which a solid electrolyte is used as an electrolyte and other constituent elements are also composed of a solid, has been advanced.

There are known techniques in which an oxide containing vanadium (V) is used as a negative electrode active material for a solid-state battery (Patent Documents 1 and 2).

Patent Document 1: Japanese Patent Application Laid-Open No. 2005-11801
Patent Document 2: Japanese Patent Application Laid-Open No. 2013-165061

SUMMARY OF THE INVENTION

The inventors of the present invention have found that it is effective to combine a negative electrode layer, which contains a negative electrode active material containing V, and a solid electrolyte layer, which contains a solid electrolyte having a lithium super ionic conductor (LISICON)-type structure, in order to suppress a side reaction during co-sintering in the prior art as described above.

The inventors of the present invention have also found that in the combination, a problem that the use rate of the negative electrode active material is excessively low during charge and discharge and/or a problem that the leakage current is excessively high during charge newly occur. For example, when the use rate of the negative electrode active material is excessively low, the discharge capacity becomes small, thus causing a problem that the energy density of the solid-state battery decreases. For example, when the leakage current is excessively high, the capacity of the solid-state battery after charge gradually decreases with the lapse of time, thus causing a problem in storage characteristics. For these reasons, it has been difficult to achieve both the energy density and the storage characteristics of the solid-state battery.

An object of the present invention is to provide a solid-state battery in which a use rate of a negative electrode active material during charge and discharge is more sufficiently high and a leakage current during charge is more sufficiently low.

The present invention relates to a solid-state battery including a negative electrode layer and a solid electrolyte layer.

The negative electrode layer contains a negative electrode active material in which a molar ratio of Li to V is 2.0 or more, the solid electrolyte layer contains a solid electrolyte having a (LISICON)-type structure and containing at least V, and the solid electrolyte contained in the solid electrolyte layer has an average chemical composition represented by:

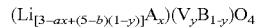

$$(Li_{[3-ax+(5-b)(1-y)]}A_x)(V_yB_{1-y})O_4$$

where A is one or more elements selected from the group consisting of Na, K, Mg, Ca, Al, Ga, Zn, Fe, Cr, and Co,
B is one or more elements selected from the group consisting of Zn, Al, Ga, Si, Ge, Sn, P, As, Ti, Mo, W, Fe, Cr, and Co,
$0 \leq x \leq 1.0$,
$0 < y \leq 0.75$,
a is an average valence of A, and
b is an average valence of B.

As a result of studies by the inventors of the present invention, it has been found that at the time of using an oxide containing V as the negative electrode active material, when the LISICON-type solid electrolyte contains V within a specific range, the use rate of the negative electrode is improved while the leakage current is reduced sufficiently.

In the solid-state battery of the present invention, the use rate of the negative electrode active material during charge and discharge is more sufficiently high, and the leakage current during charge is more sufficiently low.

DETAILED DESCRIPTION OF THE INVENTION

[Solid-State Battery]

The present invention relates to a solid-state battery. The term "solid-state battery" as used in the present specification refers in a broad sense to a battery having constituent elements (particularly, an electrolyte layer) formed of a solid, and refers in a narrow sense to an "all-solid-state battery" having constituent elements (particularly, all constituent elements) formed of a solid. The term "solid-state battery" as used in the present specification includes a so-called "secondary battery" that can be repeatedly charged and discharged, and a "primary battery" that can only be discharged. The "solid-state battery" is preferably the "secondary battery". The "secondary battery" is not excessively limited by its name but may include, for example, an electrochemical device such as a "power storage device".

The solid-state battery of the present description includes a negative electrode layer and a solid electrolyte layer and usually has a lamination structure in which a positive electrode layer and a negative electrode layer are laminated with the solid electrolyte layer interposed therebetween. Two or more positive electrode layers and two or more negative electrode layers may be laminated so long as the solid electrolyte layer is provided between the positive electrode layers and the negative electrode layers. The solid electrolyte layer is in contact with and sandwiched between the positive electrode layer and the negative electrode layer. The positive electrode layer and the solid electrolyte layer may be integrally sintered with the sintered bodies, and/or the negative electrode layer and the solid electrolyte layer may be integrally sintered with the sintered bodies, by sintering between sintered bodies. Being Integrally sintered by sintering between sintered bodies means that two or more members (particularly, layers) adjacent to or in contact with each other are bonded by sintering. Here, the two or more members (particularly, layers) may be integrally sintered while being sintered bodies.

(Negative Electrode Layer)

The negative electrode layer contains a negative electrode active material and may further contain a solid electrolyte. In the negative electrode layer, both the negative electrode active material and the solid electrolyte preferably have the form of a sintered body. For example, when the negative electrode layer contains the negative electrode active material and the solid electrolyte, the form of the sintered body is preferably achieved in which while negative electrode active material particles are bonded to each other by the solid electrolyte, the negative electrode active material particles are bonded to each other by sintering, and the negative electrode active material particles and the solid electrolyte are bonded to each other by sintering.

The negative electrode active material contains a negative electrode active material in which a molar ratio of Li (lithium) to vanadium (V) is 2.0 or more (particularly, 2 to 10). When the molar ratio is excessively small, the reactivity with the LISICON-type oxide in the solid electrolyte layer increases, and the use rate of the negative electrode active material decreases. In addition, a sufficient discharge capacity cannot be obtained. The molar ratio of Li to V in the negative electrode active material is preferably 2 to 6 from the viewpoint of further improving the use rate of the negative electrode active material and decreasing the leakage current. In the present invention, in the solid-state battery in which the negative electrode layer contains the negative electrode active material with the molar ratio of Li to V in the above range, and the solid electrolyte layer contains the solid electrolyte having a LISICON-type structure as described later, the LISICON-type solid electrolyte in the solid electrolyte layer contains V, whereby favorable bondability can be obtained between the solid electrolyte layer and the negative electrode layer. Moreover, a side reaction during co-sintering between the negative electrode active material contained in the negative electrode layer and the LISICON-type solid electrolyte in the solid electrolyte layer can be suppressed to increase the reversible capacity of the solid-state battery. As a result, it is considered that the use rate of the negative electrode active material during charge and discharge can be made more sufficiently high while the leakage current can be reduced sufficiently. When the negative electrode layer does not contain the negative electrode active material in which the molar ratio of Li to V is 2 or more, the bondability between the solid electrolyte layer and the negative electrode layer decreases, and the side reaction during co-sintering between the negative electrode active material contained in the negative electrode layer and the LISICON-type solid electrolyte in the solid electrolyte layer is not suppressed sufficiently. As a result, the use rate of the negative electrode active material decreases during charge and discharge.

From the viewpoint of further improving the use rate of the negative electrode active material and decreasing the leakage current, the negative electrode active material is preferably a compound represented by:

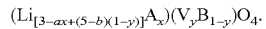

$(Li_{[3-ax+(5-b)(1-y)]}A_x)(V_yB_{1-y})O_4$.

With such a composition, it is possible to decrease reactivity with the LISICON-type solid electrolyte in the solid electrolyte layer. The negative electrode active material used in the present invention exhibits capacity by redox of V. Thus, in order to obtain a sufficient reversible capacity, the amount y of V is preferably 0.5≤y≤1.0 as described later. When the negative electrode active material has the above composition, the negative electrode active material only needs to have the above average composition in the thickness direction of the negative electrode layer, and the chemical composition may change in the thickness direction of the negative electrode layer.

In the composition of the compound of the negative electrode active material, A is one or more elements selected from the group consisting of Na (sodium), K (potassium), Mg (magnesium), Ca (calcium), Al (aluminum), Ga (gallium), Zn (zinc), Fe (iron), Cr (chromium), and Co (cobalt).

B is one or more elements selected from the group consisting of Zn (zinc), Al (aluminum), Ga (gallium), Si (silicon), Ge (germanium), Sn (tin), P (phosphorus), As (arsenic), Ti (titanium), Mo (molybdenum), W (tungsten), Fe (iron), Cr (chromium), and Co (cobalt).

x has a relationship of 0≤x≤1.0, preferably a relationship of 0≤x≤0.5, and more preferably a relationship of 0≤x≤0.1.

y has a relationship of 0.5≤y≤1.0 and preferably has a relationship of 0.55≤y≤1.0.

a is the average valence of A. The average valence of A is, for example, a value represented by (n1×a+n2×b+n3×c)/(n1+n2+n3) when n1 elements X each having a valence a+, n2 elements Y each having a valence b+, and n3 elements Z each having a valence c+ are recognized as A.

b is the average valence of B. The average valence of B is, for example, the same value as the average valence of A described above when n1 elements X each having a valence a+, n2 elements Y each having a valence b+, and n3 elements Z each having a valence c+ are recognized as B.

In the composition of the compound of the negative electrode active material, from the viewpoint of improving the availability of the negative electrode active material, further improving the use rate of the negative electrode active material, and further decreasing the leakage current, the preferred embodiment is as follows: A is one or more elements selected from the group consisting of Al and Zn.

B is one or more, particularly two, elements selected from the group consisting of Si and P.

x has a relationship of 0≤x≤0.06 and more preferably 0.

y has a relationship of 0.55≤y≤1.0 and more preferably 0.8≤y≤1.0.

a is the average valence of A.

b is the average valence of B.

Specific examples of the negative electrode active material include $Li_3VO_4$, $Li_{3.2}(V_{0.8}Si_{0.2})O_4$, $(Li_{3.1}Al_{0.03})(V_{0.8}Si_{0.2})O_4$, $(Li_{3.1}Zn_{0.05})(V_{0.8}Si_{0.2})O_4$, $Li_{3.3}(V_{0.6}P_{0.1}Si_{0.3})O_4$, $Li_{3.18}(V_{0.77}P_{0.05}Si_{0.18})O_4$, $Li_{3.07}(V_{0.90}P_{0.03}Si_{0.07})O_4$, and $Li_{3.22}(V_{0.72}P_{0.06}Si_{0.22})O_4$ The chemical composition of the negative electrode active material may be an average chemical composition. The average chemical composition of the negative electrode active material means the average value of the chemical composition of the negative electrode active material in the thickness direction of the negative electrode layer. The average chemical composition of the negative electrode active material can be analyzed and measured by breaking the solid-state battery and performing composition analysis by energy-dispersive X-ray spectroscopy (EDX) using SEM-EDX in a field of view in which the entire negative electrode layer fits in the thickness direction.

In the negative electrode layer, the average chemical composition of the negative electrode active material and the average chemical composition of the solid electrolyte to be described later can be automatically distinguished and measured in accordance with the compositions of the negative electrode active material and the solid electrolyte in the composition analysis.

The negative electrode active material can be produced, for example, by the following method. First, a raw material compound containing a predetermined metal atom is weighed so as to have a predetermined chemical composition, and water is added and mixed to obtain a slurry. The slurry is dried, calcined at 700° C. or more and 1000° C. or less for four hours or more and six hours or less, and pulverized to obtain a negative electrode active material.

As the chemical composition of the negative electrode active material, for example, when high-speed sintering is performed at 750° C. for about one minute together with the solid electrolyte layer, the chemical composition of the negative electrode active material used in the production is reflected as it is, but when sintering is performed at 750° C. for a long time of about one hour, element diffusion into the solid electrolyte layer proceeds, and the amount V usually decreases.

The negative electrode active material preferably has a $\beta_{II}$-$Li_3VO_4$-type structure or a $\gamma_{II}$-$Li_3VO_4$-type structure from the viewpoint of further improving the use rate of the negative electrode active material and further decreasing the leakage current. With such a crystal structure, the reversibility of charge and discharge is improved, and stable cycle characteristics can be obtained. In addition, by the active material having the $\gamma_{II}$-$Li_3VO_4$-type structure, bondability with the LISICON-type solid electrolyte in the solid electrolyte layer is improved, which is more preferable.

The negative electrode active material having the $\beta_{II}$-$Li_3VO_4$-type structure means that the negative electrode active material (particularly, particles thereof) has a $\beta_{II}$-$Li_3VO_4$-type crystal structure, and means in a broad sense that the negative electrode active material has a crystal structure that can be recognized as the $\beta_{II}$-$Li_3VO_4$-type crystal structure by a person skilled in the art of solid-state batteries. In a narrow sense, the negative electrode active material having the $\beta_{II}$-$Li_3VO_4$-type structure means that the negative electrode active material (particularly, particles thereof) shows one or more main peaks corresponding to a Miller index unique to a so-called $\beta_{II}$-$Li_3VO_4$-type crystal structure at a predetermined incident angle in X-ray diffraction. Examples of the negative electrode active material having the $\beta_{II}$-$Li_3VO_4$-type structure include International Centre for Diffraction Data (ICDD) Card No. 01-073-6058.

The negative electrode active material having the $\gamma_{II}$-$Li_3VO_4$-type structure means that the negative electrode active material (particularly, particles thereof) has a $\gamma_{II}$-$Li_3VO_4$-type crystal structure, and means in a broad sense that the negative electrode active material has a crystal structure that can be recognized as the $\gamma_{II}$-$Li_3VO_4$-type crystal structure by a person skilled in the field of solid-state batteries. In a narrow sense, the negative electrode active material having the $\gamma_{II}$Li3VO4-type structure means that the negative electrode active material (particularly, particles thereof) shows one or more main peaks corresponding to a Miller index unique to a so-called $\gamma_{II}$-$Li_3VO_4$-type crystal structure at a predetermined incident angle in X-ray diffraction. Examples of the negative electrode active material having the $\gamma_{II}$-$Li_3VO_4$-type structure include ICDD Card No. 01-073-2850.

The average chemical composition and crystal structure of the negative electrode active material in the negative electrode layer usually change due to element diffusion during sintering. The negative electrode active material preferably has the average chemical composition and the crystal structure described above in the solid-state battery after being sintered together with the positive electrode layer and the solid electrolyte layer. In the negative electrode active material used in the present invention, the crystal structure may change during a charge-discharge reaction, that is, insertion/extraction of Li. Therefore, the negative electrode active material in the solid-state battery of the present invention may have a crystal structure in which the negative electrode active material having the $\beta_{II}$-$Li_3VO_4$-type structure and the $\gamma_{II}$-$Li_3VO_4$-type structure passes during charge and discharge.

The average particle size of the negative electrode active material is not particularly limited but may be, for example, 0.01 μm to 20 μm, and preferably 0.1 μm to 5 μm.

As the average particle size of the negative electrode active material, for example, 10 to 100 particles can be randomly selected from the SEM image, and the particle sizes can be simply averaged to determine the average particle size (arithmetic average).

The particle size is the diameter of the spherical particle when the particle is assumed to be completely spherical. For such a particle size, for example, the cross section of the solid-state battery is cut out, a sectional SEM image is photographed using an SEM, a sectional area S of the particle is calculated using image analysis software (e.g., "A-Zou Kun" (manufactured by Asahi Kasei Engineering Corporation), and then a particle diameter R can be determined by the following formula:

$$R=2\times(S/\pi)^{1/2}.$$

Note that the average particle size of the negative electrode active material in the negative electrode layer can be automatically measured by specifying the negative electrode active material in accordance with the composition at the time of measuring the average chemical composition described above. The particle size of the negative electrode active material can be easily determined by subjecting the negative electrode active material to a thermal etching treatment after polishing, and hence the negative electrode active material may be subjected to the thermal etching treatment before the measurement of the average particle size. Specifically, the average particle size of the negative electrode active material may be an average particle size of the negative electrode active material having been subjected to the heat treatment at 700° C. for one hour after polishing.

The volume ratio of the negative electrode active material in the negative electrode layer is not particularly limited, but is preferably 20% to 80%, more preferably 30% to 75%, and still more preferably 30% to 60% from the viewpoint of further improving the use rate of the negative electrode active material and further decreasing the leakage current.

The volume ratio of the negative electrode active material in the negative electrode layer can be measured from the SEM image after focused ion beam (FIB) sectional processing. Specifically, the cross section of the negative electrode layer is observed using SEM-EDX. It is possible to measure the volume ratio of the negative electrode active material by determining from EDX that a portion where V is detected is the negative electrode active material and calculating the area ratio of the portion.

The particle shape of the negative electrode active material in the negative electrode layer is not particularly limited but may be, for example, any of a spherical shape, a flat shape, and an indefinite shape.

It is preferable that the negative electrode layer further contain a solid electrolyte, particularly a solid electrolyte having a garnet-type structure. By the negative electrode layer containing the garnet-type solid electrolyte, the ionic conductivity of the negative electrode layer can be increased, and a high rate can be expected. As described later, it is preferable that the solid electrolyte layer also further contain a solid electrolyte, particularly a solid electrolyte having a garnet-type structure. This is because, by the solid electrolyte layer containing the garnet-type solid electrolyte, the insulating property of the solid electrolyte layer can be improved. It is considered that this is because electrons are less likely to be injected due to the garnet-type solid electrolyte being less likely to be reduced during charge and discharge, and the degree of bending of the LISICON-type solid electrolyte in the solid electrolyte increases, thereby increasing the electron resistance. Therefore, at least one (particularly both) of the negative electrode layer and the solid electrolyte layer preferably includes the solid electrolyte having the garnet-type structure. That at least one of the negative electrode layer and the solid electrolyte layer contains the solid electrolyte having the garnet-type structure means that one of the negative electrode layer and the solid electrolyte layer may contain the solid electrolyte having the garnet-type structure, or both of those may contain the solid electrolyte having the garnet-type structure.

The solid electrolyte having the garnet-type structure means that the solid electrolyte has the garnet-type crystal structure, and means in a broad sense that the solid electrolyte has a crystal structure that can be recognized as the garnet-type crystal structure by a person skilled in the field of solid-state batteries. In a narrow sense, the solid electrolyte having the garnet-type structure means that the solid electrolyte shows one or more main peaks corresponding to a Miller index unique to a so-called garnet-type crystal structure at a predetermined incident angle in X-ray diffraction.

The solid electrolyte having the garnet-type structure preferably has an average chemical composition represented by:

$$(Li_{[7-ax-(b-4)y]}A_x)La_3Zr_{2-y}B_yO_{12}.$$

By the negative electrode layer containing the solid electrolyte that has the average chemical composition as described above, it is possible to achieve further improvement in the use rate of the negative electrode active material and a further decrease in the leakage current.

In the chemical composition of the solid electrolyte having the garnet-type structure, A is one or more elements selected from the group consisting of Ga (gallium), Al (aluminum), Mg (magnesium), Zn (zinc), and Sc (scandium).

B is one or more elements selected from the group consisting of Nb (niobium), Ta (tantalum), W (tungsten), Te (tellurium), Mo (molybdenum), and Bi (bismuth).

x has a relationship of $0 \leq x \leq 0.5$.

y has a relationship of $0 \leq y \leq 2.0$.

a is the average valence of A and is the same as the average valence of A in the composition of the compound of the negative electrode active material.

b is the average valence of B and is the same as the average valence of B in the composition of the compound of the negative electrode active material.

In the chemical composition of the solid electrolyte having the garnet-type structure, from the viewpoint of further improving the use rate of the negative electrode active material and decreasing the leakage current, a preferred embodiment is as follows:

A is one or more elements selected from the group consisting of Ga and Al.

B is one or more elements selected from the group consisting of Nb, Ta, W, Mo, and Bi.

x has a relationship of $0.1 \leq x \leq 0.3$.

y has a relationship of $0 \leq y \leq 1.0$, preferably a relationship of $0 \leq y \leq 0.7$.

a is the average valence of A.

b is the average valence of B.

Specific examples of the garnet-type solid electrolyte include $(Li_{6.4}Ga_{0.05}Al_{0.15})La_3Zr_2O_{12}$, $(Li_{6.4}Ga_{0.2})La_3Zr_2O_{12}$, $Li_{6.4}La_3(Zr_{1.6}Ta_{0.4})O_{12}$, $(Li_{6.4}Al_{0.2})La_3Zr_2O_{12}$, and $Li_{6.5}La_3(Zr_{1.5}Mo_{0.25})O_{12}$.

The average chemical composition of the solid electrolyte (particularly, the solid electrolyte having the garnet-type structure) in the negative electrode layer means the average value of the chemical composition of the solid electrolyte in the thickness direction of the negative electrode layer. The average chemical composition of the solid electrolyte can be analyzed and measured by breaking the solid-state battery and performing composition analysis by EDX using SEMEDX (energy-dispersive X-ray spectroscopy) in a field of view in which the entire negative electrode layer fits in the thickness direction.

In the negative electrode layer, the average chemical composition of the negative electrode active material and the average chemical composition of the solid electrolyte can be automatically distinguished and measured in accordance with the compositions of the negative electrode active material and the solid electrolyte in the composition analysis.

The solid electrolyte in the negative electrode layer can be obtained by the same method as the negative electrode active material except that a raw material compound containing a predetermined metal atom is used, or can be obtained as a commercially available product.

The average chemical composition and crystal structure of the solid electrolyte in the negative electrode layer usually change due to element diffusion during sintering. The solid electrolyte preferably has the average chemical composition and the crystal structure described above in the solid-state battery after being sintered together with the positive electrode layer and the solid electrolyte layer.

The volume ratio of the solid electrolyte (particularly, the solid electrolyte having the garnet-type structure) in the negative electrode layer is not particularly limited, but is preferably 10% to 50% and more preferably 20% to 40% from the viewpoint of the balance among further improvement in the use rate of the negative electrode active material, the decrease in the leakage current, and the enhancement of the energy density of the solid-state battery.

The volume ratio of the solid electrolyte in the negative electrode layer can be measured by the same method as the volume ratio of the negative electrode active material. The garnet-type solid electrolyte is on the basis of a portion where Zr and/or La is detected by EDX.

The negative electrode layer may further contain, for example, a sintering additive and a conductive additive in addition to the negative electrode active material and the solid electrolyte.

By the negative electrode layer containing the sintering additive, densification is possible during sintering at a lower temperature, and element diffusion at the interface between the negative electrode active material and the solid electrolyte layer can be suppressed. As the sintering additive, a sintering additive known in the field of solid-state batteries can be used. From the viewpoint of further improving the use rate of the negative electrode active material and decreasing the leakage current, the inventors have conducted studies to find that the composition of the sintering additive preferably contains at least Li (lithium), B (boron), and O (oxygen), and the molar ratio of Li to B (Li/B) is preferably 2.0 or more. These sintering additives have a low melting temperature, and the negative electrode layer can be densified at a lower temperature by promoting liquid phase sintering. Also, it has been found that by using the above composition, the side reaction between the sintering additive and the LISICON-type solid electrolyte used in the present invention can be further suppressed during co-sintering. Examples of the sintering additive satisfying the above include $Li_3BO_3$, $(Li_{2.7}Al_{0.3})BO_3$, and $Li_{2.8}(B_{0.8}C_{0.2})O_3$. Among these, it is particularly preferable to use $(Li_{2.7}Al_{0.3})BO_3$ having a particularly high ionic conductivity.

The volume ratio of the sintering additive in the negative electrode layer is not particularly limited, but is preferably 0.1 to 10% and more preferably 1% to 7% from the viewpoint of the balance among further improvement in the use rate of the negative electrode active material, the decrease in the leakage current, and the high energy density of the solid-state battery.

The volume ratio of the sintering additive in the negative electrode layer can be measured by the same method as the volume ratio of the negative electrode active material. As a detection element in EDX for a determination as a region of the sintering additive, B can be focused.

As the conductive additive in the negative electrode layer, a conductive additive known in the field of solid-state batteries can be used. From the viewpoint of further improving the use rate of the negative electrode active material and further decreasing the leakage current, examples of a preferably used conductive additive include metal materials such as Ag (silver), Au (gold), Pd (palladium), Pt (platinum), Cu (copper), Sn (tin), and Ni (nickel); and carbon materials such as carbon nanotubes such as acetylene black, Ketjen black, Super P (registered trademark), and VGCF (registered trademark). The shape of the carbon material is not particularly limited, and any shape such as a spherical shape, a plate shape, and a fibrous shape may be used. As the conductive additive, Ag and/or a carbon material is preferably used. This is because by using the above conductive additive, the side reaction hardly proceeds during co-sintering with the negative electrode material used in the present invention, and smooth charge transfer is performed between the conductive additive and the negative electrode material.

The volume ratio of the conductive additive in the negative electrode layer is not particularly limited, but is preferably 10% to 50% and more preferably 20% to 40% from the viewpoint of the balance among further improvement in the use rate of the negative electrode active material, a further decrease in the leakage current, and higher energy density of the solid-state battery.

The volume ratio of the conductive additive in the negative electrode layer can be measured by the same method as the volume ratio of the negative electrode active material. From the SEM-EDX analysis, a portion where only the signal of the used metal element is observed can be regarded as a conductive additive.

In the negative electrode layer, a porosity is not particularly limited, but is preferably 20% or less, more preferably 15% or less, and still more preferably 10% or less from the viewpoint of further improving the use rate of the negative electrode active material and further decreasing the leakage current.

As the porosity of the negative electrode layer, a value measured from an SEM image after FIB sectional processing is used.

The negative electrode layer is a layer that can be referred to as a "negative electrode active material layer". The negative electrode layer may have a so-called negative electrode current collector or a negative electrode current collecting layer.

(Positive Electrode Layer)

In the present invention, the positive electrode layer is not particularly limited. For example, the positive electrode layer contains a positive electrode active material. The positive electrode layer may have a form of a sintered body containing positive electrode active material particles.

The positive electrode active material is not particularly limited, and a positive electrode active material known in the field of solid-state batteries can be used. Examples of the positive electrode active material include lithium-containing phosphate compound particles having a Na super ionic conductor (NASICON)-type structure, lithium-containing phosphate compound particles having an olivine-type structure, lithium-containing layered oxide particles, and lithium-containing oxide particles having a spinel-type structure. Specific Examples of the lithium-containing phosphate compound having the NASICON-type structure include $Li_3V_2(PO_4)_3$. Specific Examples of the lithium-containing phosphate compound having the olivine-type structure include $Li_3Fe_2(PO_4)_3$ and $LiMnPO_4$. Specific examples of the lithium-containing layered oxide particles include $LiCoO_2$, $LiCo_{1/3}Ni_{1/3}Mn_{1/3}O_2$. Specific Examples of the lithium-containing oxide having the spinel-type structure include $LiMn_2O_4$, $LiNi_{0.5}Mn_{1.5}O_4$ and $Li_4Ti_5O_{12}$. From the viewpoint of reactivity during co-sintering with the LISICON-type solid electrolyte used in the present invention, the lithium-containing layered oxide such as $LiCoO_2$, $LiCo_{1/3}Ni_{1/3}Mn_{1/3}O_2$ is more preferably used as the positive electrode active material. Note that only one type of these positive electrode active material particles may be used, or a plurality of types may be mixed and used.

In the positive electrode layer, the positive electrode active material having the NASICON-type structure means that the positive electrode active material (particularly, particles thereof has a NASICON-type crystal structure, and means in a broad sense that the positive electrode active material has a crystal structure that can be recognized as a NASICON-type crystal structure by a person skilled in the art of solid-state batteries. In a narrow sense, the positive electrode active material having the NASICON-type structure in the positive electrode layer means that the positive electrode active material (particularly, particles thereof) shows one or more main peaks corresponding to a Miller index unique to a so-called NASICON-type crystal structure at a predetermined incident angle in X-ray diffraction. Examples of a preferably used positive electrode active material having the NASICON-type structure include the compounds exemplified above.

The positive electrode active material having the olivine-type structure in the positive electrode layer means that the positive electrode active material (particularly, particles thereof) has an olivine-type crystal structure, and means in a broad sense that the positive electrode active material has a crystal structure that can be recognized as an olivine-type crystal structure by a person skilled in the art of solid-state batteries. In a narrow sense, the positive electrode active material having the olivine-type structure in the positive electrode layer means that the positive electrode active material (particularly, particles thereof) shows one or more main peaks corresponding to a Miller index unique to a so-called olivine-type crystal structure at a predetermined incident angle in X-ray diffraction. Examples of a preferably used positive electrode active material having the olivine-type structure include the compounds exemplified above.

The positive electrode active material having the spinel-type structure in the positive electrode layer means that the positive electrode active material (particularly, particles thereof) has a spinel-type crystal structure, and means in a broad sense that the positive electrode active material has a crystal structure that can be recognized as a spinel-type crystal structure by those skilled in the art of solid-state batteries. In a narrow sense, the positive electrode active material having the spinel-type structure in the positive electrode layer means that the positive electrode active material (particularly, particles thereof) shows one or more main peaks corresponding to a Miller index unique to a so-called spinel-type crystal structure at a predetermined incident angle in X-ray diffraction. Examples of a preferably used positive electrode active material having the spinel-type structure include the compounds exemplified above.

The chemical composition of the positive electrode active material may be an average chemical composition. The average chemical composition of the positive electrode active material means the average value of the chemical composition of the positive electrode active material in the thickness direction of the positive electrode layer. The average chemical composition of the positive electrode active material can be analyzed and measured by breaking the solid-state battery and performing composition analysis by energy-dispersive X-ray spectroscopy (EDX) using SEM-EDX in a field of view in which the entire positive electrode layer fits in the thickness direction.

The positive electrode active material can be obtained by the same method as the negative electrode active material except that a raw material compound containing a predetermined metal atom is used, or can be obtained as a commercially available product.

The chemical composition and crystal structure of the positive electrode active material in the positive electrode layer usually change due to element diffusion during sintering. The positive electrode active material preferably has the chemical composition and the crystal structure described above in the solid-state battery after being sintered together with the negative electrode layer and the solid electrolyte layer.

The average particle size of the positive electrode active material is not particularly limited but may be, for example, 0.01 μm to 10 μm, and preferably 0.05 μm to 4 μm.

The average particle size of the positive electrode active material can be determined by the same method as the average particle size of the negative electrode active material in the negative electrode layer.

The average particle size of the positive electrode active material in the positive electrode layer may usually change due to sintering in the process of producing the solid-state battery. In the solid-state battery after being sintered together with the negative electrode layer and the solid electrolyte layer, the positive electrode active material may have the average particle size described above.

The particle shape of the positive electrode active material in the positive electrode layer is not particularly limited but may be, for example, any of a spherical shape, a flat shape, and an indefinite shape.

The volume ratio of the positive electrode active material in the positive electrode layer is not particularly limited, but is preferably 30% to 90%, and more preferably 40% to 70% from the viewpoint of further improving the use rate of the negative electrode active material and reducing the leakage current.

The positive electrode layer may further contain, for example, a solid electrolyte, a sintering additive, a conductive additive, and the like in addition to the positive electrode active material.

The type of the solid electrolyte contained in the positive electrode layer is not particularly limited. Examples of the solid electrolyte contained in the positive electrode layer include solid electrolytes $(Li_{6.4}Ga_{0.2})La_3Zr_2O_{12}$, $Li_{6.4}La_3(Zr_{1.6}Ta_{0.4})O_{12}$, $(Li_{6.4}Al_{0.2})La_3Zr_2O_{12}$, and $Li_{6.5}La_3(Zr_{1.5}Mo_{0.25})O_{12}$ having the garnet-type structure, a solid electrolyte $Li_{3+x}(V_{1-x}Si_x)O_4$ having the LISICON-type structure, a solid electrolyte $La_{2/3-x}Li_{3x}TiO_3$ having a perovskite-type structure, and a solid electrolyte $Li_3BO_3$—$Li_4SiO_4$ having an amorphous structure. Among these, from the viewpoint of reactivity during co-sintering with the LISICON-type solid electrolyte used in the present invention, it is particularly preferable to use the solid electrolyte having the garnet-type structure and the solid electrolyte having the LISICON-type structure.

The solid electrolyte in the positive electrode layer can be obtained by the same method as the negative electrode active material except that a raw material compound containing a predetermined metal atom is used, or can be obtained as a commercially available product.

The average chemical composition and crystal structure of the solid electrolyte in the positive electrode layer usually change due to element diffusion during sintering. The solid electrolyte preferably has the average chemical composition and the crystal structure described above in the solid-state battery after being sintered together with the negative electrode layer and the solid electrolyte layer.

The volume ratio of the solid electrolyte in the positive electrode layer is not particularly limited, but is preferably 20% to 60% and more preferably 30% to 45% from the viewpoint of the balance among further improvement in the use rate of the negative electrode active material, a further decrease in the leakage current, and higher energy density of the solid-state battery.

As the sintering additive in the positive electrode layer, the same compound as the sintering additive in the negative electrode layer can be used.

The volume ratio of the sintering additive in the positive electrode layer is not particularly limited, but is preferably 0.1% to 20% and more preferably 1% to 10% from the viewpoint of the balance among further improvement in the use rate of the negative electrode active material, a further decrease in the leakage current, and higher energy density of the solid-state battery.

As the conductive additive in the positive electrode layer, the same compound as the conductive additive in the negative electrode layer can be used.

The volume ratio of the conductive additive in the positive electrode layer is not particularly limited, but is preferably 10% to 50% and more preferably 20% to 40% from the viewpoint of the balance among further improvement in the use rate of the negative electrode active material, a further decrease in the leakage current, and higher energy density of the solid-state battery.

In the positive electrode layer, the porosity is not particularly limited, but is preferably 20% or less, more preferably 15% or less, and still more preferably 10% or less from the viewpoint of further improving the use rate of the negative electrode active material and further decreasing the leakage current.

As the porosity of the positive electrode layer, a value measured by the same method as the porosity of the negative electrode layer is used.

The positive electrode layer is a layer that can be referred to as a "positive electrode active material layer". The positive electrode layer may have a so-called positive electrode current collector or a positive electrode current collecting layer.

(Solid Electrolyte Layer)

In the present invention, the solid electrolyte layer contains a solid electrolyte (hereinafter, sometimes referred to as a "first solid electrolyte") having the LISICON-type structure and containing at least V. The solid electrolyte layer preferably has a form of a sintered body containing the first solid electrolyte. In the present invention, as described above, in the solid-state battery in which the negative electrode layer contains the negative electrode active material with the molar ratio of Li to V in the above range, and the solid electrolyte layer contains the first solid electrolyte, the first solid electrolyte has a LISICON-type structure and contains V. Thereby, the use rate of the negative electrode active material during charge and discharge can be made more sufficiently high while the leakage current can be reduced sufficiently. When the solid electrolyte layer does not contain the first solid electrolyte, the bondability between the solid electrolyte layer and the negative electrode layer decreases, and/or the side reaction during co-sintering between the negative electrode active material contained in the negative electrode layer and the LISICON-type solid electrolyte in the solid electrolyte layer is not suppressed sufficiently. As a result, the use rate of the negative electrode active material decreases during charge and discharge. It is also possible to decrease the leakage current by increasing the thickness of the solid electrolyte layer, but from the viewpoint of improving the energy density, it is preferable to decrease the leakage current while the solid electrolyte layer has a smaller thickness. In the present invention, the leakage current during charge can be more sufficiently decreased also by making the solid electrolyte layer relatively thin, and hence the present invention is more suitable for decreasing the thickness of the solid-state battery (particularly, the solid electrolyte layer).

The LISICON-type structure of the first solid electrolyte in the solid electrolyte layer encloses a $\beta_I$ structure, a $\beta_{II}$-type structure, a $\beta_{II}'$-type structure, a $T_I$-type structure, a $T_{II}$-type structure, a $\gamma_{II}$-type structure, and a $\gamma_0$-type structure. That is, the solid electrolyte layer may contain one or more of the solid electrolytes having the $\beta_I$ structure, the $\beta_{II}$-type structure, the $\beta_{II}'$-type structure, the $T_I$-type structure, the $T_{II}$-type structure, the $\gamma_{II}$-type structure, the $\gamma_0$-type structure, or the composite structure thereof. The LISICON-type structure of the first solid electrolyte is preferably the $\gamma_{II}$-type structure from the viewpoint of further improving the use rate of the negative electrode active material and further decreasing the leakage current.

In the solid electrolyte layer, the first solid electrolyte having the $\gamma_{II}$-type structure means that the solid electrolyte has the $\gamma_{II}$-type crystal structure, and means in a broad sense that the solid electrolyte has a crystal structure that can be recognized as the $\gamma_{II}$-type crystal structure by a person skilled in the field of solid-state batteries. In a narrow sense, the first solid electrolyte having the $\gamma_{II}$-type structure in the solid electrolyte layer means that the solid electrolyte shows one or more main peaks corresponding to a Miller index unique to a so-called $\gamma_{II}$-$Li_3VO_4$-type crystal structure at a predetermined incident angle in X-ray diffraction. A compound (i.e., solid electrolyte) having the $\gamma_{II}$-type structure is described, for example, in the document "J. solid state chem" (A. R. West et al., J. solid state chem., Vol. 4, p 20-28 (1972)), and an example thereof includes ICDD Card No. 01-073-2850.

In the solid electrolyte layer, the first solid electrolyte having the $\beta_I$-type structure means that the solid electrolyte has a $\beta_I$-type crystal structure, and means in a broad sense that the solid electrolyte has a crystal structure that can be recognized as the $\beta_I$-type crystal structure by a person skilled in the field of solid-state batteries. In a narrow sense, the first solid electrolyte having the $\beta_I$-type structure in the solid electrolyte layer means that the solid electrolyte shows one or more main peaks corresponding to a Miller index unique to a so-called $\beta_I$-$Li_3VO_4$-type crystal structure at a predetermined incident angle in X-ray diffraction. A compound (i.e., solid electrolyte) having the $\beta_I$-type structure is described, for example, in the document "J. solid state chem" (A. R. West et al., J. solid state chem., Vol. 4, p 20-28 (1972)), and as an example thereof, for example, X-ray diffraction (XRD) data (spacing d-values and corresponding Miller indices) described in the following table is shown.

TABLE 1

| $Li_2CoSiO_4$ $\beta_I$, 25° C. | | |
|---|---|---|
| d(Å) | I | h k l |
| 5.4 | 80 | 1 1 0 |
| 4.08 | 60 | 1 2 0 |
| 3.88 | 60 | 1 0 1 |
| 3.65 | 100 | 1 1 1, 0 2 1 |
| 3.14 | 20 | 2 0 0, 1 2 1 |
| 3.10 | 40 | 1 3 0 |
| 2.71 | 80 | 2 2 0 |
| 2.68 | 60 | 0 4 0 |
| 2.47 | 80 | 0 0 2 |
| 2.38 | 60 | 2 2 1 |
| 2.36 | 20 | 0 4 1 |

In the solid electrolyte layer, the first solid electrolyte having the $\beta_{II}$-type structure means that the solid electrolyte has a $\beta_{II}$-type crystal structure, and means in a broad sense that the solid electrolyte has a crystal structure that can be recognized as the $\beta_{II}$-type crystal structure by a person skilled in the field of solid-state batteries. In a narrow sense, the first solid electrolyte having the $\beta_{II}$-type structure in the solid electrolyte layer means that the solid electrolyte shows one or more main peaks corresponding to a Miller index unique to a so-called $\beta_{II}$-$Li_3VO_4$-type crystal structure at a predetermined incident angle in X-ray diffraction. A compound (i.e., solid electrolyte) having the $\beta_{II}$-type structure is described, for example, in the document "J. solid state chem" (A. R. West et al., J. solid state chem., Vol. 4, p 20-28 (1972)), and an example thereof includes ICDD Card No. 00-024-0675.

In the solid electrolyte layer, the first solid electrolyte having the $\beta_{II}'$-type structure means that the solid electrolyte has a $\beta_{II}'$-type crystal structure, and means in a broad sense that the solid electrolyte has a crystal structure that can be recognized as the $\beta_{II}'$-type crystal structure by a person skilled in the field of solid-state batteries. In a narrow sense, the first solid electrolyte having the $\beta_{II}'$-type structure in the solid electrolyte layer means that the solid electrolyte shows one or more main peaks corresponding to a Miller index unique to a so-called $\beta_{II}'$-$Li_3VO_4$-type crystal structure at a predetermined incident angle in X-ray diffraction. A compound (i.e., solid electrolyte) having the $\beta_{II}'$-type structure is described, for example, in the document "J. solid state chem" (A. R. West et al., J. solid state chem., Vol. 4, p 20-28 (1972)), and as an example thereof, for example, XRD data (spacing d-values and corresponding Miller indices) described in the following table is shown.

TABLE 2

Li$_2$CoGeO$_4$
β$_{II}$, 25° C.

| d(Å) | I | h k l |
|---|---|---|
|  |  | 0 1 0 |
| 4.17 | 80 | 1 1 0 |
| 3.96 | 80 | 1 0 1 |
| 3.70 | 10 | 0 1 1 |
| 3.20 | 20 | 2 0 0, 1 1 1 |
| 2.75 | 100 | 2 1 0 |
| 2.74 | 60 | 0 2 0 |
| 2.50 | 80 | 0 0 2 |
|  |  | 1 2 0 |

In the solid electrolyte layer, the first solid electrolyte having the T$_I$-type structure means that the solid electrolyte has a T$_I$-type crystal structure, and means in a broad sense that the solid electrolyte has a crystal structure that can be recognized as the T$_I$-type crystal structure by a person skilled in the field of solid-state batteries. In a narrow sense, the first solid electrolyte having the T$_I$-type structure in the solid electrolyte layer means that the solid electrolyte shows one or more main peaks corresponding to a Miller index unique to a so-called T$_I$-Li$_3$VO$_4$-type crystal structure at a predetermined incident angle in X-ray diffraction. A compound (i.e., solid electrolyte) having a T$_I$-type structure is described, for example, in the document "J. solid state chem" (A. R. West et al., J. solid state chem., Vol. 4, p 20-28 (1972)), and an example thereof includes ICDD Card No. 00-024-0668.

In the solid electrolyte layer, the first solid electrolyte having the T$_{II}$-type structure means that the solid electrolyte has a T$_{II}$-type crystal structure, and means in a broad sense that the solid electrolyte has a crystal structure that can be recognized as the T$_{II}$-type crystal structure by a person skilled in the field of solid-state batteries. In a narrow sense, the first solid electrolyte having the T$_{II}$-type structure in the solid electrolyte layer means that the solid electrolyte shows one or more main peaks corresponding to a Miller index unique to a so-called T$_{II}$-Li$_3$VO$_4$-type crystal structure at a predetermined incident angle in X-ray diffraction. A compound (i.e., solid electrolyte) having a T$_{II}$-type structure is described, for example, in the document "J. solid state chem" (A. R. West et al., J. solid state chem., Vol. 4, p 20-28 (1972)), and an example thereof includes ICDD Card No. 00-024-0669.

In the solid electrolyte layer, the first solid electrolyte having the γ$_0$-type structure means that the solid electrolyte has a γ$_0$-type crystal structure, and means in a broad sense that the solid electrolyte has a crystal structure that can be recognized as the γ$_0$-type crystal structure by a person skilled in the field of solid-state batteries. In a narrow sense, the first solid electrolyte having the γ$_0$-type structure in the solid electrolyte layer means that the solid electrolyte shows one or more main peaks corresponding to a Miller index unique to a so-called γ$_0$-Li$_3$VO$_4$-type crystal structure at a predetermined incident angle in X-ray diffraction. A compound (i.e., solid electrolyte) having the γ$_0$-type structure is described, for example, in the document "J. solid state chem" (A. R. West et al., J. solid state chem., Vol. 4, p 20-28 (1972)), and as an example thereof, for example, XRD data (spacing d-values and corresponding Miller indices) described in the following table is shown.

TABLE 3

Li$_2$CoSiO$_4$
γ$_0$, 25° C.

| d(Å) | I | h k l |
|---|---|---|
| 5.4 | 60 | 1 1 0, 0 2 0 |
| 4.08 | 80 | 1 2 0 |
| 3.92 | 60 | 1 0 1 |
| 3.69 | 20 | 1 1 1, 0 2 1 |
| 3.67 | 100 |  |
| 3.16 | 20 | 1 2 1 |
| 3.10 | 60 | 2 0 0, 1 3 0, 2 1 0 |
| 2.90 | 20 | 0 3 1 |
| 2.71 | 100 | 2 2 0 |
| 2.68 | 60 | 0 4 0 |
| 2.65 | 20 | 1 3 1 |
| 2.64 | 20 |  |
| 2.59 | 20 | 2 1 1 |
| 2.57 | 20 |  |
| 2.51, | 100 | 0 0 2 |

In the solid electrolyte layer, the first solid electrolyte usually has an average chemical composition represented by a compound represented by:

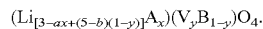
$(Li_{[3-ax+(5-b)(1-y)]}A_x)(V_yB_{1-y})O_4$.

In the solid electrolyte contained in the solid electrolyte layer, A is one or more elements selected from the group consisting of Na (sodium), K (potassium), Mg (magnesium), Ca (calcium), Al (aluminum), Ga (gallium), Zn (zinc), Fe (iron), Cr (chromium), and Co (cobalt).

B is one or more elements selected from the group consisting of Zn (zinc), Al (aluminum), Ga (gallium), Si (silicon), Ge (germanium), Sn (tin), P (phosphorus), As (arsenic), Ti (titanium), Mo (molybdenum), W (tungsten), Fe (iron), Cr (chromium), and Co (cobalt).

x has a relationship of 0≤x≤1.0, particularly 0≤x≤0.2.

y has a relationship of 0<y≤0.75, particularly 0.05≤y≤0.75, and from the viewpoint of further decreasing the leakage current, y preferably has a relationship of 0<y≤0.65 (particularly, 0.05≤y≤0.65), and more preferably 0<y≤0.48 (particularly, 0.05≤y≤0.48). When y is 0, the use rate of the negative electrode active material decreases due to the peeling of the interface between the negative electrode layer and the solid electrolyte layer, and charge and discharge can be hardly performed. When y exceeds 0.75, the leakage current is excessively high, and the capacity of the solid-state battery after charge gradually decreases with time, so that storage characteristics deteriorate.

From the viewpoint of a balance between further improvement in the use rate of the negative electrode active material and a further decrease in the leakage current, y preferably has a relationship of 0<y≤0.65 (particularly, 0.05≤y≤0.65), more preferably 0.25≤y≤0.48.

a is the average valence of A and is the same as the average valence of A in the composition of the compound of the negative electrode active material.

b is the average valence of B and is the same as the average valence of B in the composition of the compound of the negative electrode active material.

In the solid electrolyte contained in the solid electrolyte layer, from the viewpoint of further improving the use rate of the negative electrode active material and further decreasing the leakage current, in a preferred embodiment, A is Al.

B is one or more elements selected from the group consisting of Si, Ge, and P.

x has a relationship of $0 \leq x \leq 0.2$, particularly $0 \leq x \leq 0.1$.

y has a relationship of $0 < y \leq 0.75$, particularly $0.05 \leq y \leq 0.75$, and from the viewpoint of further decreasing the leakage current, y preferably has a relationship of $0 < y \leq 0.65$ (particularly, $0.05 \leq y \leq 0.65$), and more preferably $0 < y \leq 0.48$ (particularly, $0.05 \leq y \leq 0.48$).

From the viewpoint of a balance between further improvement in the use rate of the negative electrode active material and a further decrease in the leakage current, y preferably has a relationship of $0 < y \leq 0.65$ (particularly, $0.05 \leq y \leq 0.65$), more preferably $0.25 \leq y \leq 0.48$.

The average chemical composition of the first solid electrolyte in the solid electrolyte layer means the average value of the chemical composition of the first solid electrolyte in the thickness direction of the solid electrolyte layer. The average chemical composition of the first solid electrolyte can be analyzed and measured by breaking the solid-state battery and performing composition analysis by energy dispersive X-ray spectroscopy (EDX) using SEM-EDX in a field of view in which the entire negative electrode layer fits in the thickness direction.

In the solid electrolyte layer, the average chemical composition of the first solid electrolyte having the LISICON-type structure and the average chemical composition of the solid electrolyte having the garnet-type structure, described later, can be automatically distinguished and measured in accordance with the compositions of those solid electrolytes in the composition analysis. For example, from the SEM-EDX analysis, the portion of the first solid electrolyte (i.e., the solid electrolyte having the LISICON-type structure) can be separated by identification by detection of V, and the portion of the second solid electrolyte (e.g., the garnet-type solid electrolyte) can be separated by identification by La and Zr.

The first solid electrolyte in the solid electrolyte layer can be obtained by the method as that of the negative electrode active material except that a raw material compound containing a predetermined metal atom is used, or can be obtained as a commercially available product.

The chemical composition and crystal structure of the first solid electrolyte in the solid electrolyte layer usually change due to element diffusion during sintering. The first solid electrolyte preferably has the chemical composition and crystal structure described above in the solid-state battery after being sintered together with the negative electrode layer and the positive electrode layer. In particular, as the chemical composition of the first solid electrolyte, for example, when high-speed sintering is performed at 750° C. for about one minute together with the negative electrode layer, the chemical composition of the solid electrolyte used in production is reflected as it is, but when sintering is performed at 750° C. for a long time of about one hour, element diffusion from the negative electrode active material in the negative electrode layer proceeds, and the amount V usually increases.

The volume ratio of the first solid electrolyte in the solid electrolyte layer is not particularly limited, but is preferably 10% to 80%, more preferably 20% to 60%, and still more preferably 30% to 60% from the viewpoint of further improving the use rate of the negative electrode active material and further decreasing the leakage current.

The volume ratio of the first solid electrolyte in the solid electrolyte layer can be measured by the same method as the volume ratio of the positive electrode active material.

The solid electrolyte layer preferably further contains a solid electrolyte (hereinafter, sometimes referred to simply as a "second solid electrolyte") having the garnet-type structure. By the solid electrolyte layer containing the second solid electrolyte, the insulating property of the solid electrolyte layer can be improved as described above. It is considered that this is because electrons are less likely to be injected due to the second solid electrolyte being less likely to be reduced during charge and discharge, and the degree of bending of the first solid electrolyte in the solid electrolyte increases, thereby increasing the electron resistance.

The second solid electrolyte is the same as the solid electrolyte having the garnet-type structure, which is preferably contained in the negative electrode layer, and may be selected from the same range as the solid electrolyte having the garnet-type structure described in the description of the negative electrode layer. When both the solid electrolyte layer and the negative electrode layer contain the solid electrolyte having the garnet-type structure, the solid electrolyte having the garnet-type structure contained in the solid electrolyte layer and the solid electrolyte having the garnet-type structure contained in the negative electrode layer may have the same chemical composition or different chemical compositions from each other.

A preferred second solid electrolyte for the solid electrolyte layer is a solid electrolyte having the chemical composition of the solid electrolyte having the garnet-type structure, where:

A is one or more (particularly, two) elements selected from the group consisting of Ga and Al.

B is one or more elements selected from the group consisting of Nb, Ta, W, Mo, and Bi.

x has a relationship of $0 \leq x \leq 0.3$.

y has a relationship of $0 \leq y \leq 1.0$, preferably a relationship of $0 \leq y \leq 0.7$, and more preferably 0.

a is the average valence of A.

b is the average valence of B.

The average chemical composition of the second solid electrolyte in the solid electrolyte layer means the average value of the chemical composition of the second solid electrolyte in the thickness direction of the solid electrolyte layer. The average chemical composition of the second solid electrolyte can be analyzed and measured by breaking the solid-state battery and performing composition analysis by energy-dispersive X-ray spectroscopy (EDX) using SEM-EDX in a field of view in which the entire solid electrolyte layer fits in the thickness direction.

The volume ratio of the second solid electrolyte in the solid electrolyte layer is not particularly limited, but is preferably 10% to 80%, more preferably 20% to 70%, and still more preferably 40% to 60% from the viewpoint of further improving the use rate of the negative electrode active material and further decreasing the leakage current.

The volume ratio of the second solid electrolyte in the solid electrolyte layer can be measured by the same method as the volume ratio of the positive electrode active material.

The solid electrolyte layer may further contain, for example, a sintering additive and the like in addition to the solid electrolyte. From the viewpoint of further improving the use rate of the negative electrode active material and further decreasing the leakage current, it is preferable that at least one of, or preferably both, the negative electrode layer and the solid electrolyte layer further contain the sintering additive. At least one of the negative electrode layer and the solid electrolyte layer further containing the sintering additive means that one of the negative electrode layer and the solid electrolyte layer may further contain the sintering additive, or both may further contain the sintering additive.

As the sintering additive in the solid electrolyte layer, the same compound as the sintering additive in the negative electrode layer can be used.

The volume ratio of the sintering additive in the solid electrolyte layer is not particularly limited, but is preferably 0.1% to 20% and more preferably 1% to 10% from the viewpoint of the balance among further improvement in the use rate of the negative electrode active material, a further decrease in the leakage current, and higher energy density of the solid-state battery.

The thickness of the solid electrolyte layer is usually 0.1 to 30 μm, and is preferably 20 to 1 μm from the viewpoint of the balance between the decrease in the thickness of the solid electrolyte layer and the further decrease in the leakage current.

As the thickness of the solid electrolyte layer, an average value of thicknesses measured at ten arbitrary points in the SEM image is used.

In the solid electrolyte layer, the porosity is not particularly limited, but is preferably 20% or less, more preferably 15% or less, and still more preferably 10% or less from the viewpoint of further improving the use rate of the negative electrode active material and further decreasing the leakage current.

As the porosity of the solid electrolyte layer, a value measured by the same method as the porosity of the negative electrode layer is used.

The chemical composition of the solid electrolyte layer is not necessarily homogeneous in the solid electrolyte layer, and for example, the chemical composition may change in the thickness direction. In particular, the insulating property can be improved when the average composition of the first solid electrolyte in the solid electrolyte layer satisfies the above condition.

[Method for Producing Solid-State Battery]

The solid-state battery can be produced, for example, by a so-called green sheet method, a printing method, or a method combining these methods.

The green sheet method will be described.

First, a solvent, a resin, and the like are appropriately mixed with the positive electrode active material to prepare a paste. The paste is applied onto a sheet and dried to form a first green sheet for forming a positive electrode layer. The first green sheet may contain a solid electrolyte, a conductive additive, a sintering additive, and/or the like.

A solvent, a resin, and the like are appropriately mixed with the negative electrode active material to prepare a paste. The paste is applied onto the sheet and dried to form a second green sheet for constituting the negative electrode. The second green sheet may contain a solid electrolyte, a conductive additive, a sintering additive, and/or the like.

A solvent, a resin, and the like are appropriately mixed with the solid electrolyte to prepare a paste. The paste is applied and dried to prepare a third green sheet for constituting the solid electrolyte layer. The third green sheet may contain a sintering additive or the like.

Next, the first to third green sheets are appropriately laminated to prepare a laminate. The produced laminate may be pressed. Examples of a preferable pressing method include an isostatic pressing method.

Thereafter, the laminate is sintered at, for example, 600 to 800° C. to obtain a solid-state battery.

The printing method will be described.

The printing method is the same as the green sheet method except for the following matters.

An ink of each layer is prepared, the ink having the same composition as the composition of the paste of each layer for obtaining a green sheet except that the blending amounts of the solvent and the resin are adjusted to those suitable for use as the ink.

The ink of each layer is printed and laminated to produce a laminate.

Hereinafter, the present invention will be described in more detail on the basis of specific examples, but the present invention is not limited to the following examples and can be appropriately changed and implemented without changing the gist thereof.

EXAMPLES

[Production of Material]

In (1) to (3) below, a negative electrode active material, a solid electrolyte, and a sintering additive, which are used for producing a negative electrode layer, and first and second solid electrolytes and a sintering additive, which are used for producing a solid electrolyte layer, were produced.

Tables described below shows the average chemical compositions of the respective materials of each layer after the sintering of the positive electrode layer, the negative electrode layer, the solid electrolyte, and the like in each of examples and comparative examples, but in Comparative Examples 1 to 8 and Examples 1 to 17 and 20 to 24, these average chemical compositions remained unchanged before and after sintering. Thus, in the tables, the average chemical compositions described in these comparative examples and examples also means the average chemical compositions of the respective materials used.

Since the sintering conditions of Examples 18 and 19 were different from those in the other examples and comparative examples, the average chemical compositions of the respective materials of each layer changed before and after sintering. The average chemical compositions of the respective materials used in each of Examples 18 and 19 were equivalent to the average chemical compositions of the respective materials used in Examples 9 and 11.

(1) Production of Garnet-Type Solid Electrolyte Powder (Solid Electrolyte Powder of Negative Electrode Layer and Second Solid Electrolyte Powder of Solid Electrolyte Layer)

The garnet-type solid electrolyte powder used in each of the examples and comparative examples was produced as follows:

As a raw material, lithium hydroxide monohydrate $LiOH \cdot H_2O$, lanthanum hydroxide $La(OH)_3$, zirconium oxide $ZrO_2$, gallium oxide $Ga_2O_3$, aluminum oxide $Al_2O_3$, niobium oxide $Nb_2O_5$, tantalum oxide $Ta_2O_5$, and molybdenum oxide $MoO_3$ were used.

Each raw material was weighed so that the chemical composition is a predetermined chemical composition, water was added thereto, the resulting mixture was sealed in a 100 ml polyethylene pot and rotated at 150 rpm for 16 hours on a pot rack to mix the raw materials. Lithium hydroxide monohydrate $LiOH \cdot H_2O$ as a Li source was prepared in excess of 3 wt % with respect to the target composition in consideration of Li deficiency during sintering.

The obtained slurry was evaporated and dried, and then calcined at 900° C. for five hours to obtain a target phase.

A mixed solvent of toluene and acetone was added to the obtained calcined powder, and the calcined powder was pulverized with a planetary ball mill for six hours.

The pulverized powder was dried to obtain a solid electrolyte powder. The powder was confirmed to have no compositional deviation by ICP measurement.

(2) Production of Negative Electrode Active Material Powder and LISICON-Type Solid Electrolyte Powder (First Solid Electrolyte Powder of Solid Electrolyte Layer)

The negative electrode active material powder and the first solid electrolyte powder used in each of the examples and comparative examples were produced as follows.

As raw materials, lithium hydroxide monohydrate $LiOH \cdot H_2O$, vanadium pentoxide $V_2O_5$, silicon oxide $SiO_2$, germanium oxide $GeO_2$, phosphorus oxide $P_2O_5$, aluminum oxide $Al_2O_3$, and zinc oxide ZnO were used.

Each raw material was appropriately weighed so that the chemical composition is a predetermined chemical composition, water was added thereto, the resulting mixture was sealed in a 100 ml polyethylene pot and rotated at 150 rpm for 16 hours on a pot rack to mix the raw materials.

The obtained slurry was evaporated and dried, and then calcined in air at 800° C. for five hours.

Alcohol was added to the obtained calcined powder, and the calcined powder was sealed again in the 100 ml polyethylene pot and rotated at 150 rpm for 16 hours on the pot rack to be pulverized.

The pulverized powder was again calcined at 900° C. for five hours.

Thereafter, a mixed solvent of toluene and acetone was added to the obtained sintered powder, and the mixture was pulverized for six hours with a planetary ball mill and dried to obtain a negative electrode active material powder and a first solid electrolyte powder. The powder was confirmed to have no compositional deviation by ICP measurement.

(3) Production of Sintering Additive Powder

A sintering additive powder used in each of the examples and comparative examples was produced as follows.

As raw materials, lithium hydroxide monohydrate $LiOH \cdot H_2O$, boron oxide $B_2O_3$, lithium carbonate $Li_2CO_3$, and aluminum oxide $Al_2O_3$ were used.

Each raw material was appropriately weighed so as to have a predetermined chemical composition, mixed well in a mortar, and then calcined at 650° C. for five hours.

Thereafter, the calcined powder was pulverized and mixed well in the mortar again, and then calcinated at 680° C. for 40 hours.

A mixed solvent of toluene and acetone was added to the obtained sintered powder, and the mixture was pulverized with a planetary ball mill for six hours and dried to obtain a sintering additive powder. The powder was confirmed to have no compositional deviation by ICP measurement.

Examples 1 to 25 and Comparative Examples 1 to 8

(Production of Solid-State Battery)

A solid-state battery was produced as follows.

$LiCoO_2$ as a positive electrode active material, $Li_{3.2}V_{0.8}Si_{0.2}O_4$ as a solid electrolyte powder, and $Li_3BO_3$ as a sintering additive were weighed, and kneaded with a butyral resin, alcohol, and a binder to prepare a positive electrode layer slurry. In all the examples and comparative examples, the volume ratio of the positive electrode active material, the solid electrolyte, and the sintering additive was 50:45:5.

The garnet-type solid electrolyte powder, the LISICON-type solid electrolyte powder, and the sintering additive powder produced in each of (1) to (3) above were weighed, and kneaded with the butyral resin, alcohol, and binder to prepare a solid electrolyte layer slurry.

The volume ratio among the LISICON-type solid electrolyte, the garnet-type solid electrolyte powder, and the sintering additive powder used in Examples 1 to 11 and 18 to 25 and Comparative Examples 1 to 2 and 6 to 8 was 47.5:47.5:5.

In Example 13 and Comparative Examples 3 to 5, only the LISICON type was used.

The volume ratio of the LISICON-type solid electrolyte powder and the sintering additive powder used in Examples 12 and 14 to 17 was 95:5.

The garnet-type solid electrolyte powder, the negative electrode active material powder, the sintering additive powder, and an Ag powder as the conductive additive produced in each of (1) to (3) above were weighed, and kneaded with the butyral resin, alcohol, and binder to produce a negative electrode layer slurry.

The volume ratio of the negative electrode active material powder, the solid electrolyte powder, the conductive additive powder, and the sintering additive powder used in Examples 1 to 12 and 18 to 25 and Comparative Examples 1 to 2 and 6 to 8 was 35:30:30:5.

The volume ratio of the negative electrode active material powder and the conductive additive powder used in Example 13 and Comparative Example 3 was 70:30.

The volume ratio of the negative electrode active material powder, the solid electrolyte powder, the conductive additive powder, and the sintering additive powder used in Examples 14 to 17 was 35:30:30:5.

Each of these slurries was subjected to sheet molding on a PET film using the doctor blade method to obtain a positive electrode layer sheet, a solid electrolyte layer sheet, and a negative electrode layer sheet. Next, the positive electrode layer sheet, the solid electrolyte layer sheet, and the negative electrode sheet were laminated and pressure-bonded to obtain a laminate of a solid-state battery. The laminate was cut into a square shape having dimensions of 10 mm×10 mm and sandwiched between two porous setters, the binder was removed at 400° C., and the resultant object was then sintered at 750° C. to produce the solid-state battery. Thereafter, the solid-state battery was sealed with a 2032 type coin cell and evaluated.

Note that sintering in each of Examples 1 to 17 and 20 to 25 and Comparative Examples 1 to 3 and 6 to 8 was performed at 750° C. for one minute.

The sintering in each of Examples 18 and 19 was performed at 750° C. for one hour.

As a result of confirming the thicknesses of the positive electrode layer, the solid electrolyte layer and the negative electrode layer using a scanning electron microscope, the thicknesses of the positive electrode layer, the solid electrolyte layer and the negative electrode layer were about 25 µm, about 15 µm, and about 18 to 25 µm, respectively, in all the examples and comparative examples. Note that the thickness of the negative electrode layer was different between the negative electrode layer containing the garnet-type solid electrolyte and the negative electrode layer not containing the garnet-type solid electrolyte. Specifically, the thickness of the negative electrode layer containing the garnet-type solid electrolyte was 25 µm because the volume ratio of the negative electrode active material decreases, and the thickness of the negative electrode layer containing no garnet-type solid electrolyte was 8 µm.

In all the examples and comparative examples, the average thickness of the solid electrolyte layer was 15 μm.

In all the comparative examples and examples, the porosity of each of the solid electrolyte layer, the positive electrode layer, and the negative electrode layer was 10% or less, and it was confirmed that sintering proceeded sufficiently.

[Evaluation of Solid-State Battery]

The solid-state batteries of each of the examples and comparative examples were evaluated as follows.

(Use Rate of Negative Electrode Active Material)

By a constant current charge and discharge test, an electric quantity was measured in a voltage range of 1.0 V to 3.9 V at a current density corresponding to 0.05 C, and a reversible capacity was calculated.

The initial reversible capacity was calculated by dividing an initial reversible electric quantity, obtained from the constant current charge and discharge test, by the weight of the negative electrode active material. A capacity when V in the negative electrode active material proceeded by the two-electron reaction was defined as a theoretical capacity, and the initial reversible capacity was divided by the theoretical capacity to calculate a use rate R.

⊙: 89%≤R≤100% (best)
○: 79%≤R≤89% (good)
Δ: 70%≤R<79% (acceptable) (no problem in practical use)
×: R<70% (failure) (problem in practical use)

(Leakage Current)

In another sample, charge and discharge were performed at a constant current up to 3.9 V, and then a constant voltage test was performed at 3.9 V to measure a transient current. A steady current observed after 10,000 minutes of holding the constant voltage was read as a leakage current I (A/cm$^2$) derived from the electron conductivity of the solid electrolyte. In Comparative Examples 1 and 2, due to the occurrence of peeling between the negative electrode layer and the solid electrolyte layer, it was difficult to accurately measure the leakage current.

⊙: I≤5×10$^{-7}$ (best)
○: 5×10$^{-7}$<I≤1×10$^{-6}$ (good)
Δ: 1×10$^{-6}$<I≤1.8×10$^{-6}$ (acceptable) (no problem in practical use)
×: 1.8×10$^{-6}$<I (failure) (problem in practical use)

[Measurement]

(Average Chemical Composition)

Each of the chemical formulas in Tables 4 to 7 indicates an average chemical composition. The average chemical composition means an average value of chemical compositions in the thickness direction of the positive electrode layer, the negative electrode layer, or the solid electrolyte layer.

The average chemical composition was measured by the following method. For the average chemical composition, the solid-state battery was broken, the cross section was polished by ion milling, and then quantitative analysis (composition analysis) by EDX was performed using SEM-EDX (energy-dispersive X-ray spectroscopy) in a field of view in which the entire thickness direction of each layer fit, thereby obtaining the average chemical composition of the negative electrode active material in the negative electrode layer and the average chemical composition of the LISICON-type solid electrolyte (i.e., the first solid electrolyte) in the solid electrolyte layer. In the present invention, composition analysis by EMAX-Evolution manufactured by HORIBA, Ltd. was used for EDX. Since it is difficult to quantify Li, the calculation was performed using the above chemical formula, from information of A and B prepared before sintering of the chemical formula $Li_{[3-ax+(5-b)(1-y)]}A_x(V_yB_{1-y})O_4$ and information of x and y obtained by composition analysis of EDX.

In the layer containing the garnet-type solid electrolyte and/or the sintering additive, by removing the constituent elements of these from the quantitative analysis, the average chemical composition of the negative electrode active material in the negative electrode layer and the average chemical composition of the LISICON-type solid electrolyte (i.e., the first solid electrolyte) in the solid electrolyte layer were obtained.

In Comparative Examples 1 to 8 and Examples 1 to 17 and 20 to 25 in which the sintering conditions were 750° C. and one minute, it was confirmed that the average chemical compositions of the negative electrode active material and the solid electrolyte in the negative electrode layer and the average chemical compositions of the first and second solid electrolytes in the solid electrolyte layer after sintering were equivalent to the respective compositions before sintering (preparation).

Note that the average chemical compositions of the negative electrode active material and the solid electrolyte in the negative electrode layer and the average chemical compositions of the first and second solid electrolytes in the solid electrolyte layer before sintering in each of Examples 18 and 19 are equivalent to the average chemical compositions before sintering in Examples 9 and 11.

(Average Particle Size)

The average particle size of 100 arbitrary particles was determined by performing particle analysis using an SEM image or a TEM image of each layer and image analysis software (e.g., "A-Zou Kun" (manufactured by Asahi Kasei Engineering Corporation)) and calculating the equivalent circle diameter.

Examples 1 to 10 and Comparative Examples 1 to 5 and 6 to 8

As shown in Comparative Examples 1 and 2, it has been found that in the samples in which the $Li_3VO_4$ negative electrode active material having the $β_{II}$-$Li_3VO_4$ structure is used for the negative electrode layer and the LISICON-type solid electrolyte containing no V is used for the solid electrolyte layer, the use rate of the negative electrode active material is 5% or less, and charge and discharge can be hardly performed. From the SEM observation, peeling was observed at the interface between the negative electrode layer and the solid electrolyte layer, and it has been found that the insufficient bondability between the two layers is a factor that the charge-discharge capacity cannot be obtained. Due to the occurrence of peeling between the negative electrode layer and the solid electrolyte layer, it was difficult to accurately measure the leakage current. As shown in Comparative Example 3, it has been found that by using a $Li_{3.2}V_{0.8}Si_{0.2}O_4$ negative electrode active material with the $γ_{II}$-$Li_3VO_4$ structure for the negative electrode layer, the bondability is partly improved, but a reversible capacity cannot be obtained as before.

It has been found from Comparative Examples 4 and 5 that when both the first solid electrolyte and the negative electrode active material contain V, and when a negative electrode active material having a Li/V ratio of less than 2 is used, the use rate of the negative electrode active material is 5% or less, and charge and discharge can be hardly performed. It has been found from the XRD measurement that the first solid electrolyte decomposed after co-sintering.

It has been found from Comparative Examples 6 to 8 that when the ratio of V in the first solid electrolyte composition is excessively large, the leakage current is excessively high, and the capacity of the solid-state battery after charge gradually decreases with time, so that a problem occurs in storage characteristics.

On the other hand, as shown in Examples 1 to 10, it has been found that by using the LISICON-type solid electrolyte containing V (i.e., first solid electrolyte) in the solid electrolyte layer, the bondability to the negative electrode layer is significantly improved, and the use rate of the negative electrode active material is improved significantly.

In Examples 1 to 10, as the amount y of V in the first solid electrolyte increased, the insulating property of the solid electrolyte layer itself decreased, and the leakage current of the cell tended to increase, but such a tendency was within a range in which there is no problem in practical use. It is considered that such a tendency is on the basis of the fact that electrons are injected along with the reduction of V in the first solid electrolyte during charge and discharge due to the first solid electrolyte containing V, but the tendency was within a range in which there is no problem in practical use. That is, it has been found that when the amount y of V in the first solid electrolyte was more than 0.65, the leakage current is more than $1 \times 10^{-6}$ A/cm$^2$ and increases within an allowable range. In the present invention, it has been found that there is a correlation between the magnitude of the leakage current and the amount y of V, and it has been found that the leakage current becomes significantly smaller as the amount y of V becomes smaller. It has been found that when the amount y of V is $0 < y \leq 0.65$, the leakage current is $1 \times 10^{-6}$ A/cm$^2$ or less, and the reversible capacity and the insulating property of the solid-state battery are compatible in a preferable balance. It has been found that when the amount y of V is $0.05 \leq y \leq 0.48$, the leakage current decreases to $5 \times 10^{-7}$ A/cm$^2$ or less, which is still more preferable. It has been found that the amount y of V is more preferably $0.25 \leq y \leq 0.48$ from the viewpoint of the balance between the reversible capacity and the insulating property of the solid-state battery.

TABLE 4

| | Negative electrode layer | | | Solid electrolyte layer |
|---|---|---|---|---|
| | Negative electrode active material Average composition (Crystal structure) | Solid electrolyte Average composition (Crystal structure) | Sintering additive | First solid electrolyte (LISICON) Average composition (Crystal structure) |
| Comparative Example 1 | Li3VO4 ($\beta_{II}$-Li3VO4-type) | (Li6.4Ga0.05Al0.15)La3Zr2O12 (Garnet-type) | Li3BO3 | Li3.3(P0.7Ge0.3)O4 ($\gamma_{II}$-type) |
| Comparative Example 2 | Li3VO4 ($\beta_{II}$-Li3VO4-type) | (Li6.4Ga0.05Al0.15)La3Zr2O12 (Garnet-type) | Li3BO3 | Li3.3(P0.7Si0.3)O4 ($\gamma_{II}$-type) |
| Comparative Example 3 | Li3.2(V0.8Si0.2)O4 ($\beta_{II}$-Li3VO4-type) | — | — | Li3.3(P0.7Si0.3)O4 ($\gamma_{II}$-type) |
| Comparative Example 4 | LiVO3 | — | — | Li3.2(P0.8Si0.2)O4 ($\gamma_{II}$-type) |
| Comparative Example 5 | Li3V2(PO4)3 | — | — | Li3.2(P0.8Si0.2)O4 ($\gamma_{II}$-type) |
| Comparative Example 6 | Li3VO4 ($\beta_{II}$-Li3VO4-type) | (Li6.4Ga0.05Al0.15)La3Zr2O12 (Garnet-type) | Li3BO3 | Li3VO4 ($\gamma_{II}$-type) |
| Comparative Example 7 | Li3VO4 ($\beta_{II}$-Li3VO4-type) | (Li6.4Ga0.05Al0.15)La3Zr2O12 (Garnet-type) | Li3BO3 | Li3.07(V0.93Si0.07)O4 ($\gamma_{II}$-type) |
| Comparative Example 8 | Li3VO4 ($\beta_{II}$-Li3VO4-type) | (Li6.4Ga0.05Al0.15)La3Zr2O12 (Garnet-type) | Li3BO3 | Li3.2(V0.8Si0.2)O4 ($\gamma_{II}$-type) |
| Example 1 | Li3VO4 ($\beta_{II}$-Li3VO4-type) | (Li6.4Ga0.05Al0.15)La3Zr2O12 (Garnet-type) | Li3BO3 | Li3.2(V0.7P0.1Si0.2)O4 ($\gamma_{II}$-type) |
| Example 2 | Li3VO4 ($\beta_{II}$-Li3VO4-type) | (Li6.4Ga0.05Al0.15)La3Zr2O12 (Garnet-type) | Li3BO3 | Li3.3(V0.7Si0.3)O4 ($\gamma_{II}$-type) |
| Example 3 | Li3VO4 ($\beta_{II}$-Li3VO4-type) | (Li6.4Ga0.05Al0.15)La3Zr2O12 (Garnet-type) | Li3BO3 | Li3.3(V0.6P0.1Si0.3)O4 ($\gamma_{II}$-type) |
| Example 4 | Li3VO4 ($\beta_{II}$-Li3VO4-type) | (Li6.4Ga0.05Al0.15)La3Zr2O12 (Garnet-type) | Li3BO3 | Li3.3(V0.5P0.2Si0.3)O4 ($\gamma_{II}$-type) |
| Example 5 | Li3VO4 ($\beta_{II}$-Li3VO4-type) | (Li6.4Ga0.05Al0.15)La3Zr2O12 (Garnet-type) | Li3BO3 | Li3.3(V0.4P0.3Si0.3)O4 ($\gamma_{II}$-type) |
| Example 6 | Li3VO4 ($\beta_{II}$-Li3VO4-type) | (Li6.4Ga0.05Al0.15)La3Zr2O12 (Garnet-type) | Li3BO3 | Li3.3(V0.3P0.4Si0.3)O4 ($\gamma_{II}$-type) |
| Example 7 | Li3VO4 ($\beta_{II}$-Li3VO4-type) | (Li6.4Ga0.05Al0.15)La3Zr2O12 (Garnet-type) | Li3BO3 | Li3.3(V0.2P0.5Si0.3)O4 ($\gamma_{II}$-type) |
| Example 8 | Li3VO4 ($\beta_{II}$-Li3VO4-type) | (Li6.4Ga0.05Al0.15)La3Zr2O12 (Garnet-type) | Li3BO3 | Li3.3(V0.1P0.6Si0.3)O4 ($\gamma_{II}$-type) |
| Example 9 | Li3VO4 ($\beta_{II}$-Li3VO4-type) | (Li6.4Ga0.05Al0.15)La3Zr2O12 (Garnet-type) | Li3BO3 | Li3.5(V0.3P0.2Si0.5)O4 ($\gamma_{II}$-type) |
| Example 10 | Li3VO4 ($\beta_{II}$-Li3VO4-type) | (Li6.4Ga0.05Al0.15)La3Zr2O12 (Garnet-type) | Li3BO3 | Li3.5(V0.3P0.2Ge0.25Si0.25)O4 ($\gamma_{II}$-type) |

TABLE 4-continued

| | | Solid electrolyte layer | | Evaluation | |
|---|---|---|---|---|---|
| | | Second solid electrolyte (LISICON) Average composition (Crystal structure) | Sintering additive | Active material use rate (%) | Leakage current (A/cm2) |
| Comparative Example 1 | | (Li6.4Ga0.05Al0.15)La3Zr2O12 (Garnet-type) | Li3BO3 | 5% or less X | Unmeasurable |
| Comparative Example 2 | | (Li6.4Ga0.05Al0.15)La3Zr2O12 (Garnet-type) | Li3BO3 | 5% or less X | Unmeasurable |
| Comparative Example 3 | | — | — | 65% X | $1.7 \times 10^{-7}$ ☉ |
| Comparative Example 4 | | — | — | 5% or less X | $4.0 \times 10^{-6}$ X |
| Comparative Example 5 | | — | — | 5% or less X | $3.2 \times 10^{-6}$ X |
| Comparative Example 6 | | (Li6.4Ga0.05Al0.15)La3Zr2O12 (Garnet-type) | Li3BO3 | 90% ☉ | $9.1 \times 10^{-6}$ X |
| Comparative Example 7 | | (Li6.4Ga0.05Al0.15)La3Zr2O12 (Garnet-type) | Li3BO3 | 89% ☉ | $7.5 \times 10^{-6}$ X |
| Comparative Example 8 | | (Li6.4Ga0.05Al0.15)La3Zr2O12 (Garnet-type) | Li3BO3 | 92% ☉ | $2.0 \times 10^{-6}$ X |
| Example 1 | | (Li6.4Ga0.05Al0.15)La3Zr2O12 (Garnet-type) | Li3BO3 | 90% ☉ | $1.3 \times 10^{-6}$ Δ |
| Example 2 | | (Li6.4Ga0.05Al0.15)La3Zr2O12 (Garnet-type) | Li3BO3 | 91% ☉ | $1.5 \times 10^{-6}$ Δ |
| Example 3 | | (Li6.4Ga0.05Al0.15)La3Zr2O12 (Garnet-type) | Li3BO3 | 93% ☉ | $7.1 \times 10^{-7}$ ○ |
| Example 4 | | (Li6.4Ga0.05Al0.15)La3Zr2O12 (Garnet-type) | Li3BO3 | 92% ☉ | $5.8 \times 10^{-7}$ ○ |
| Example 5 | | (Li6.4Ga0.05Al0.15)La3Zr2O12 (Garnet-type) | Li3BO3 | 90% ☉ | $2.6 \times 10^{-7}$ ☉ |
| Example 6 | | (Li6.4Ga0.05Al0.15)La3Zr2O12 (Garnet-type) | Li3BO3 | 89% ☉ | $2.1 \times 10^{-7}$ ☉ |
| Example 7 | | (Li6.4Ga0.05Al0.15)La3Zr2O12 (Garnet-type) | Li3BO3 | 85% ○ | $1.4 \times 10^{-7}$ ☉ |
| Example 8 | | (Li6.4Ga0.05Al0.15)La3Zr2O12 (Garnet-type) | Li3BO3 | 86% ○ | $1.5 \times 10^{-7}$ ☉ |
| Example 9 | | (Li6.4Ga0.05Al0.15)La3Zr2O12 (Garnet-type) | Li3BO3 | 91% ☉ | $1.9 \times 10^{-7}$ ☉ |
| Example 10 | | (Li6.4Ga0.05Al0.15)La3Zr2O12 (Garnet-type) | Li3BO3 | 91% ☉ | $1.7 \times 10^{-7}$ ☉ |

Examples 5 and 11 to 17

Table 5 shows the use rates and the leakage currents of the active materials of the solid-state batteries with varied types of the active material and the solid electrolytes added to the negative electrode layer and the solid electrolyte layer.

It is found from the comparison of Examples 5 and 11 that when the negative electrode active material is changed from $Li_3VO_4$ having the $\beta_{II}$-$Li_3VO_4$ structure to $Li_{3.2}V_{0.8}SiO_4$ having the $\beta_{II}$-$Li_3VO_4$ structure, the use rate of the active material is improved. It is considered that this is because the use of the active material having the $\gamma_{II}$-$Li_3VO_4$ structure improves the bondability between the two layers.

It is found from the comparison of Examples 11, 12, and 14 that the addition of the garnet-type solid electrolyte to the solid electrolyte layer leads to a decrease in the leakage current, which is more preferable. It is considered that this is because electrons are less likely to be injected due to the garnet-type solid electrolyte being less likely to be reduced during charge and discharge, and the degree of bending of the LISICON-type solid electrolyte in the solid electrolyte increases, thereby increasing the electron resistance.

It is found from the comparison of Examples 12 and 13 that the addition of the garnet-type solid electrolyte to the negative electrode layer improves the use rate of the active material is improved. It is considered that this is because the addition of the garnet-type solid electrolyte leads to an increase in ion path in the negative electrode layer.

It has been found from Examples 15 to 17 that when the Li site of the LISICON-type oxide in the solid electrolyte layer or the negative electrode active material in the negative electrode layer is substituted, a low leakage current of $1 \times 10^{-6}$ A/cm$^2$ or less can be obtained.

TABLE 5

| | Negative electrode layer | | | Solid electrolyte layer |
|---|---|---|---|---|
| | Negative electrode active material Average composition (Crystal structure) | Solid electrolyte Average composition (Crystal structure) | Sintering additive | First solid electrolyte (LISICON) Average composition (Crystal structure) |
| Example 5 | Li3VO4 ($\beta_{II}$-Li3VO4- type) | (Li6.4Ga0.05Al0.15)La3Zr2O12 (Garnet-type) | Li3BO3 | Li3.3(V0.4P0.3Si0.3)O4 ($\gamma_{II}$-type) |

TABLE 5-continued

| | | | | |
|---|---|---|---|---|
| Example 11 | Li3.2(V0.8Si0.2)O4 ($\beta_{II}$-Li3VO4- type) | (Li6.4Ga0.05Al0.15)La3Zr2O12 (Garnet-type) | Li3BO3 | Li3.3(V0.4P0.3Si0.3)O4 ($\gamma_{II}$-type) |
| Example 12 | Li3.2(V0.8Si0.2)O4 ($\beta_{II}$-Li3VO4-type) | (Li6.4Ga0.05Al0.15)La3Zr2O12 (Garnet-type) | Li3BO3 | Li3.3(V0.4P0.3Si0.3)O4 ($\gamma_{II}$-type) |
| Example 13 | Li3.2(V0.8Si0.2)O4 ($\beta_{II}$-Li3VO4-type) | — | — | Li3.3(V0.4P0.3Si0.3)O4 ($\gamma_{II}$-type) |
| Example 14 | Li3.2(V0.8Si0.2)O4 ($\beta_{II}$-Li3VO4-type) | — | Li3BO3 | Li3.3(V0.4P0.3Si0.3)O4 ($\gamma_{II}$-type) |
| Example 15 | (Li3.1Al0.03)(V0.8Si0.2)O4 ($\beta_{II}$-Li3VO4-type) | — | Li3BO3 | Li3.3(V0.4P0.3Si0.3)O4 ($\gamma_{II}$-type) |
| Example 16 | (Li3.1Zn0.05)(V0.8Si0.2)O4 ($\beta_{II}$-Li3VO4-type) | — | Li3BO3 | Li3.3(V0.4P0.3Si0.3)O4 ($\gamma_{II}$-type) |
| Example 17 | Li3.2(V0.8Si0.2)O4 ($\beta_{II}$-Li3VO4-type) | — | Li3BO3 | (Li3.2Al0.03)(V0.4P0.3Si0.3)O4 ($\gamma_{II}$-type) |

| | | Solid electrolyte layer | | Evaluation | |
|---|---|---|---|---|---|
| | | Second solid electrolyte (LISICON) Average composition (Crystal structure) | Sintering additive | Active material use rate (%) | Leakage current (A/cm2) |
| | Example 5 | (Li6.4Ga0.05Al0.15)La3Zr2O12 (Garnet-type) | Li3BO3 | 90% ⊙ | 2.6 × 10$^{-7}$ ⊙ |
| | Example 11 | (Li6.4Ga0.05Al0.15)La3Zr2O12 (Garnet-type) | Li3BO3 | 95% ⊙ | 2.5 × 10$^{-7}$ ⊙ |
| | Example 12 | — | Li3BO3 | 94% ⊙ | 4.2 × 10$^{-7}$ ⊙ |
| | Example 13 | — | — | 88% ○ | 4.8 × 10$^{-7}$ ⊙ |
| | Example 14 | — | Li3BO3 | 88% ○ | 4.5 × 10$^{-7}$ ⊙ |
| | Example 15 | — | Li3BO3 | 83% ○ | 4.7 × 10$^{-7}$ ⊙ |
| | Example 16 | — | Li3BO3 | 84% ○ | 4.3 × 10$^{-7}$ ⊙ |
| | Example 17 | — | Li3BO3 | 81% ○ | 4.3 × 10$^{-7}$ ⊙ |

Examples 9, 11 and 18 to 19

Table 6 shows the active material use rates and the leakage currents of the solid-state batteries (Examples 18 and 19, respectively) in which element diffusion was caused to proceed between the negative electrode layer and the solid electrolyte layer by using the same sheet laminate as in Examples 9 and 11 and extending the sintering time from one minute to one hour.

From the comparison of Example 18 and Example 9 and the comparison of Examples 19 and 11, it is found that by extending the sintering time, element diffusion proceeds to bring a change in the average compositions of the negative electrode active material in the negative electrode layer and the LISICON-type solid electrolyte in the solid electrolyte layer. On the other hand, it has been found that when element diffusion proceeds, a favorable use rate of the negative electrode active material and a favorable leakage current can be obtained by the amount y of V satisfying a predetermined range.

TABLE 6

| | | Negative electrode layer | | | Solid electrolyte layer |
|---|---|---|---|---|---|
| | | Negative electrode active material Average composition (Crystal structure) | Solid electrolyte Average composition (Crystal structure) | Sintering additive | First solid electrolyte (LISICON) Average composition (Crystal structure) |
| | Example 9 | Li3VO4 ($\beta_{II}$-Li3VO4- type) | (Li 6.4Ga0.05Al0.15)La3Zr2O12 (Garnet-type) | Li3BO3 | Li3.5(V0.3P0.2Si0.5)O4 ($\gamma_{II}$-type) |
| | Example 18 | Li3.07(V0.90P0.03Si0.07)O4 ($\beta_{II}$-Li3VO4- type) | (Li 6.4Ga0.05Al0.15)La3Zr2O12 (Garnet-type) | Li3BO3 | Li3.41(V0.45P0.14Si0.41)O4 ($\gamma_{II}$-type) |
| | Example 11 | Li3.2(V0.8Si0.2)O4 ($\beta_{II}$-Li3VO4-type) | (Li 6.4Ga0.05Al0.15)La3Zr2O12 (Garnet-type) | Li3BO3 | Li3.3(V0.4P0.3Si0.3)O4 ($\gamma_{II}$-type) |
| | Example 19 | Li3.22(V0.72P0.06Si0.22)O4 ($\beta_{II}$-Li3VO4-type) | (Li 6.4Ga0.05Al0.15)La3Zr2O12 (Garnet-type) | Li3BO3 | Li3.26(V0.52P0.22Si0.26)O4 ($\gamma_{II}$-type) |

| | | Solid electrolyte layer | | Evaluation | |
|---|---|---|---|---|---|
| | | Second solid electrolyte (LISICON) Average composition (Crystal structure) | Sintering additive | Active material use rate (%) | Leakage current (A/cm2) |
| | Example 9 | (Li6.4Ga0.05Al0.15)La3Zr2O12 (Garnet-type) | Li3BO3 | 91% ⊙ | 1.9 × 10$^{-7}$ ⊙ |
| | Example 18 | (Li6.4Ga0.05Al0.15)La3Zr2O12 (Garnet-type) | Li3BO3 | 92% ⊙ | 3.5 × 10$^{-7}$ ⊙ |

TABLE 6-continued

| | | | | | |
|---|---|---|---|---|---|
| Example 11 | (Li6.4Ga0.05Al0.15)La3Zr2O12 (Garnet-type) | Li3BO3 | 95% ☉ | 2.5 × 10$^{-7}$ ☉ | |
| Example 19 | (Li6.4Ga0.05Al0.15)La3Zr2O12 (Garnet-type) | Li3BO3 | 96% ☉ | 6.4 × 10$^{-7}$ ○ | |

Examples 20 to 25

Table 7 shows the active material use rates and the leakage currents of the solid-state batteries (Examples 20 to 25) with varied compositions of the garnet-type solid electrolyte and the sintering additive.

It has been found from Examples 20 to 25 that when the garnet-type solid electrolyte and the sintering additive have various compositions, it is possible to obtain a favorable use rate of the negative electrode active material and a favorable leakage current.

TABLE 7

| | Negative electrode layer | | | Solid electrolyte layer |
|---|---|---|---|---|
| | Negative electrode active material Average composition (Crystal structure) | Solid electrolyte Average composition (Crystal structure) | Sintering additive | First solid electrolyte (LISICON) Average composition (Crystal structure) |
| Example 20 | Li3.2(V0.8Si0.2)O4 ($\beta_{II}$-Li3VO4-type) | (Li6.4Ga0.2)La3Zr2O12 (Garnet-type) | Li3BO3 | Li3.3 (V0.4P0.3Si0.3)O4 ($\gamma_{II}$-type) |
| Example 21 | Li3.2(V0.8Si0.2)O4 ($\beta_{II}$-Li3VO4-type) | Li6.4La3(Zr1.6Ta0.4)O12 (Garnet-type) | Li3BO3 | Li3.3(V0.4P0.3Si0.3)O4 ($\gamma_{II}$-type) |
| Example 22 | Li3.2(V0.8Si0.2)O4 ($\beta_{II}$-Li3VO4-type) | (Li6.4Al0.2)La3Zr2O12 (Garnet-type) | Li3BO3 | Li3.3(V0.4P0.3Si0.3)O4 ($\gamma_{II}$-type) |
| Example 23 | Li3.2(V0.8Si0.2)O4 ($\beta_{II}$-Li3VO4-type) | Li6.5La3(Zr1.5Mo0.25)O12 (Garnet-type) | Li3BO3 | Li3.3(V0.4P0.3Si0.3)O4 ($\gamma_{II}$-type) |
| Example 24 | Li3.2(V0.8Si0.2)O4 ($\beta_{II}$-Li3VO4-type) | Li6.5La3(Zr1.5Mo0.25)O12 (Garnet-type) | (Li2.7Al0.3)BO3 | Li3.3(V0.4P0.3Si0.3)O4 ($\gamma_{II}$-type) |
| Example 25 | Li3.2(V0.8Si0.2)O4 ($\beta_{II}$-Li3VO4-type) | Li6.5La3(Zr1.5Mo0.25)O12 (Garnet-type) | Li2.8(B0.8C0.2)O3 | Li3.3(V0.4P0.3Si0.3)O4 ($\gamma_{II}$-type) |

| | Solid electrolyte layer | | Evaluation | |
|---|---|---|---|---|
| | Second solid electrolyte (LISICON) Average composition (Crystal structure) | Sintering additive | Active material use rate (%) | Leakage current (A/cm2) |
| Example 20 | (Li6.4Ga0.2)La3Zr2O12 (Garnet-type) | Li3BO3 | 94% ☉ | 2.5 × 10$^{-7}$ ☉ |
| Example 21 | (Li6.4La3(Zr1.6Ta0.4)O12 (Garnet-type) | Li3BO3 | 93% ☉ | 2.2 × 10$^{-7}$ ☉ |
| Example 22 | (Li6.4Al0.2)La3Zr2O12 (Garnet-type) | Li3BO3 | 91% ☉ | 2.7 × 10$^{-7}$ ☉ |
| Example 23 | (Li6.5La3(Zr1.5Mo0.25)O12 (Garnet-type) | Li3BO3 | 93% ☉ | 3.0 × 10$^{-7}$ ☉ |
| Example 24 | (Li6.5La3(Zr1.5Mo0.25)O12 (Garnet-type) | (Li2.7Al0.3)BO3 | 97% ☉ | 1.9 × 10$^{-7}$ ☉ |
| Example 25 | (Li6.5La3(Zr1.5Mo0.25)O12 (Garnet-type) | Li2.8(B0.8C0.2)O3 | 95% ☉ | 2.2 × 10$^{-7}$ ☉ |

The solid-state battery according to one embodiment of the present invention can be used in various fields where the use or storage of a battery is assumed. Although it is merely an example, the solid-state battery according to an embodiment of the present invention can be used in the field of electronics mounting. The solid-state battery according to one embodiment of the present invention can also be used in: the electric, information, and communications fields in which mobile devices and the like are used (e.g., the field of electric and electronic equipment or mobile equipment including mobile phones, smart phones, smartwatches, laptop computers, digital cameras, small electronic machines such as activity meters, arm computers, electronic papers, wearable devices, RFID tags, card-type electronic money, and smartwatches, etc.); household and small industrial applications (e.g., the fields of electric tools, golf carts, and household/nursing/industrial robots); large industrial applications (e.g., the fields of forklifts, elevators, and harbor cranes); the transportation system field (e.g., the fields of hybrid vehicles, electric vehicles, buses, trains, power-assisted bicycles, electric two-wheeled vehicles, etc.); power system applications (e.g., the fields of various types of power generation, road conditioners, smart grids, household power storage systems, etc.); medical applications (the field of medical equipment such as earphone hearing aids); medical applications (the fields of dosage management systems, etc.); the Internet of Things (IoT) field; space and deep sea applications (e.g., the fields of space probes, submersible research vessels, etc.), and the like.

The invention claimed is:
1. A solid-state battery comprising:
a positive electrode layer;
a negative electrode layer; and
a solid electrolyte layer interposed between the positive electrode layer and the negative electrode layer, wherein the negative electrode layer contains a negative electrode active material in which a molar ratio of Li to vanadium (V) is 2.0 or more, the solid electrolyte layer contains a solid electrolyte having a lithium super ionic conductor structure and containing at least V, the solid electrolyte contained in the solid electrolyte layer has an average chemical composition represented by: $(Li_{[3-ax+(5-b)(1-y)]}A_x)(V_yB_{1-y})O_4$ where A is one or more elements selected from the group consisting of Na, K, Mg, Ca, Al, Ga, Zn, Fe, Cr, and Co, B is one or more elements selected from the group consisting of Zn, Al, Ga, Si, Ge, Sn, P, As, Ti, Mo, W, Fe, Cr, and Co, $0 \leq x \leq 1.0$, $0 < y \leq 0.75$, $[3-ax+(5-b)(1-y)] > 0$, a is an average valence of A, and b is an average valence of B, the negative electrode active material has an average chemical composition represented by: $(Li'_{[3-a'x'+(5-b')(1-y')]}A'_{x'})(V_{y'}B'_{1-y'})O_4$ where A' is one or more elements selected from the group consisting of Na, K, Mg, Ca, Al, Ga, Zn, Fe, Cr, and Co, B' is one or more elements selected from the group consisting of Zn, Al, Ga, Si, Ge, Sn, P, As, Ti, Mo, W, Fe, Cr, and Co, $0 \leq x' \leq 1.0$, $0.5 \leq y' \leq 1.0$, a' is an average valence of A', and b' is an average valence of B' wherein the amount y of V in the solid electrolyte contained in the solid electrolyte layer is lower than the amount y' of V' in the negative electrode active material, and a difference between y and y' is greater than 0.4.

2. The solid-state battery according to claim 1, wherein, in the negative electrode active material:

A' is one or more elements selected from the group consisting of Al and Zn,

B' is one or more elements selected from the group consisting of Si and P, and $0 \leq x' \leq 0.06$, and $0.55 \leq y' \leq 1.0$.

3. The solid-state battery according to claim 1, wherein the negative electrode active material has a $\beta_{II}$-$Li_3VO_4$-type structure or a $\gamma_{II}$-$Li_3VO_4$-type structure.

4. The solid-state battery according to claim 1, wherein, in the solid electrolyte contained in the solid electrolyte layer, $0 < y \leq 0.65$.

5. The solid-state battery according to claim 1, wherein in the solid electrolyte contained in the solid electrolyte layer, $0.05 \leq y \leq 0.48$.

6. The solid-state battery according to claim 1, wherein in the solid electrolyte contained in the solid electrolyte layer, $0.25 \leq y \leq 0.48$.

7. The solid-state battery according to claim 1, wherein in the solid electrolyte contained in the solid electrolyte layer, $0 \leq x \leq 0.2$.

8. The solid-state battery according to claim 1, wherein at least one of the negative electrode layer and the solid electrolyte layer further contains a solid electrolyte having a garnet-type structure.

9. The solid-state battery according to claim 8, wherein the solid electrolyte having a garnet-type structure has an average chemical composition represented by: $(Li_{[7-a''x''-(b''-4)y'']}A''_{x''})La_3Zr_{2-y''}B''_{y''}O_{12}$ where A" is one or more elements selected from the group consisting of Ga, Al, Mg, Zn, and Sc, B" is one or more elements selected from the group consisting of Nb, Ta, W, Te, Mo, and Bi, $0 \leq x'' \leq 0.5$, $0 \leq y'' \leq 2.0$, a" is an average valence of A", and b" is an average valence of B".

10. The solid-state battery according to claim 9, wherein, in the solid electrolyte having a garnet-type structure:

A" is one or more elements selected from the group consisting of Ga and Al,

B" is one or more elements selected from the group consisting of Nb, Ta, W, Mo, and Bi, $0.1 \leq x'' \leq 0.3$, and $0 \leq y'' \leq 1.0$.

11. The solid-state battery according to claim 1, wherein the negative electrode layer further contains a conductive additive.

12. The solid-state battery according to claim 1, wherein at least one of the negative electrode layer and the solid electrolyte layer further contains a sintering additive, and the sintering additive is a compound that has a chemical composition containing Li, boron, and O and in which a molar ratio of Li to boron is 2.0 or more.

13. The solid-state battery according to claim 1, wherein the solid electrolyte layer, the positive electrode layer, and the negative electrode layer are an integrally sintered body.

14. The solid-state battery according to claim 1, wherein the molar ratio of Li to vanadium (V) is 2 to 10.

15. The solid-state battery according to claim 1, wherein the molar ratio of Li to vanadium (V) is 2 to 6.

16. The solid-state battery according to claim 1, wherein, in the solid electrolyte contained in the solid electrolyte layer:

A is Al,

B is one or more elements selected from the group consisting of Si, Ge, and P, and $0 \leq x \leq 0.2$.

17. The solid-state battery according to claim 1, wherein a volume ratio of the solid electrolyte in the solid electrolyte layer is 10% to 80%.

18. The solid-state battery according to claim 1, wherein the difference between y and y' is 0.5 or greater.

* * * * *